United States Patent [19]

Bradley et al.

[11] 4,447,874

[45] May 8, 1984

[54] APPARATUS AND METHOD FOR COMMUNICATION OF INFORMATION BETWEEN PROCESSES IN AN INFORMATION SYSTEM

[75] Inventors: John J. Bradley, Garches, France; Benjamin S. Franklin, Cambridge, Mass.; David M. Slosberg, Paris, France; Marc Appell, Paris, France; Jean-Claude Cassonnet, Paris, France; Philippe D. De Sabatier, Paris, France

[73] Assignee: Compagnie Honeywell Bull, Paris, France

[21] Appl. No.: 254,185

[22] Filed: Apr. 14, 1981

Related U.S. Application Data

[63] Continuation of Ser. No. 60,161, Jul. 24, 1979, abandoned, which is a continuation of Ser. No. 911,815, Jun. 1, 1978, abandoned, which is a continuation of Ser. No. 570,101, Apr. 21, 1975, abandoned.

[30] Foreign Application Priority Data

Apr. 25, 1974 [FR] France .............................. 74 14489

[51] Int. Cl.³ .............................................. G06F 9/00
[52] U.S. Cl. ..................................... 364/200; 364/300
[58] Field of Search ................................ G06F/9/00; 364/200 MS File, 900 MS File

[56] References Cited

U.S. PATENT DOCUMENTS

| | | | |
|---|---|---|---|
| 3,562,717 | 2/1971 | Harmon et al. | 364/200 |
| 3,593,297 | 7/1971 | Kadner | 364/200 |
| 3,599,176 | 8/1971 | Cordero et al. | 364/200 |
| 3,656,123 | 4/1972 | Carnevale et al. | 364/200 |
| 3,686,641 | 8/1972 | Logan et al. | 364/200 |
| 3,710,324 | 1/1973 | Cohen et al. | 364/200 |
| 3,771,146 | 11/1973 | Cotton et al. | 364/200 |
| 3,854,126 | 12/1974 | Gray et al. | 364/200 |
| 3,858,182 | 12/1974 | Delagi et al. | 364/200 |

*Primary Examiner*—Raulfe B. Zache
*Attorney, Agent, or Firm*—Lowe, King, Price & Becker

[57] ABSTRACT

An apparatus for enabling communication of information between processes being carried out on a computing system. Each process is assigned a control block including a specialized memory element. A process being executed modifies the state of each memory element if it discovers any information of interest to processes awaiting execution. Before the next process is executed, the memory element in its control block is tested to find out if the previously-executed process left any information of interest.

8 Claims, 60 Drawing Figures

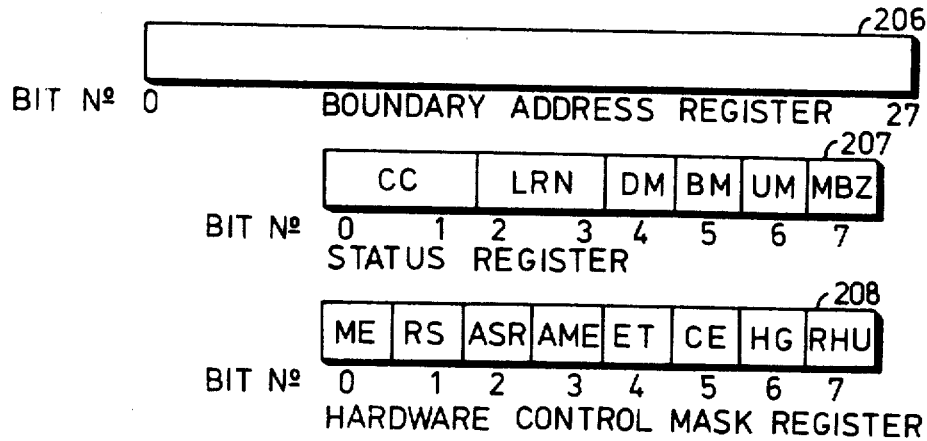

FIG. 3

LEGEND FOR RESERVED AERAS OF STORAGE
IN REGISTERS

AME = ACCOUTING MECHANISM
ASR = AUTO STORAGE RECONFIGURATION
BM = BINARY MASK
CC = CONDITION CODE
CE = CORRECTED ERROR
DM = DECIMAL MASK
ET = ENVIRONMENT TOLERANCE
HG = HARDWARE GATE
LRN = LAST RING NUMBER
MBZ = MUST BE ZERO
ME = MACHINE ERROR
RING = RING NUMBER
RHU = RESERVED FOR HARDWARE USE
RS = RETRY SUCCESSFUL
S = SIGN
STE = SEGMENT TABLE ENTRY
STN = SEGMENT TABLE NUMBER
TAG = DESCRIPTOR TYPE
UM = UNDERFLOW MASK

| MEMORY LOCATION | | | | | NAME | |
|---|---|---|---|---|---|---|
| -40 | CURRENT STATE ENTRY TIME | | | | CET | OPTIONAL |
| -32 | READY TIME ACCOUNTING | | | | RTA | |
| -24 | WAITING TIME ACCOUNTING | | | | WTA | |
| -16 | RUNNING TIME ACCOUNT | | | | RUA | |
| -8 | RESIDUAL TIME OUT | | | | RTO | |
| PCB ADDRESS → 0 | CAPABILITY | PRIORITY | STATE | DEXT | PMW#0 | |
| 4 | STATUS | MBZ | MP | MBZ | PMW#1 | |
| 8 | | | | | PMW#2 | |
| 12 | DETSZ | DETA | | | PMW#3 | |
| 16 | STWSZ | STWA | | | ASW#0 | |
| 20 | STWSZ | STWA | | | ASW#1 | |
| 24 | | | | | EXW | |
| 28 | T CONTENTS | | | | SKW | |
| 32 | IC CONTENTS | | | | ICW | |
| 36 | MBZ | | | | | |
| 40 | | | | | SBW#0 | |
| 44 | | | | | SBW#1 | |
| 48 | | | | | SBW#2 | |
| 52 | BASE REGISTERS SAVING AREA (8 WORDS) | | | | | |
| 80 | | | | | | |
| 84 | GENERAL REGISTERS SAVING AREA (16 WORDS) | | | | | |
| 144 | | | | | | |
| 148 | SCIENTIFIC REGISTERS SAVING AREA (8 WORDS) | | | | | OPTIONAL |
| 176 | | | | | | |

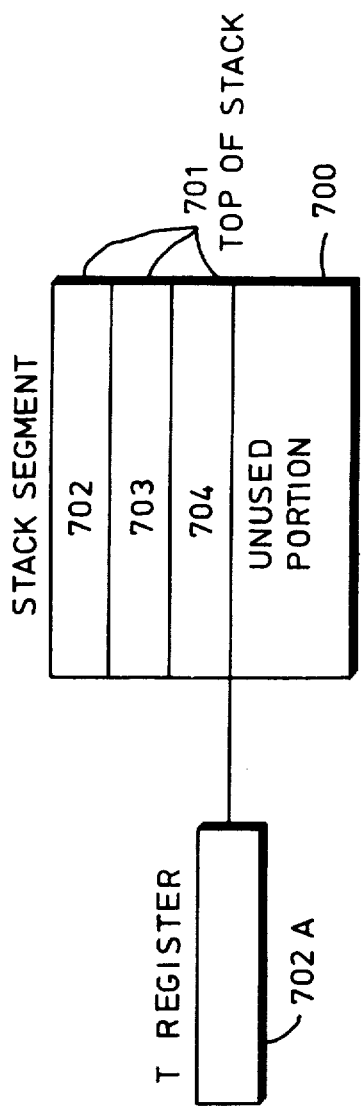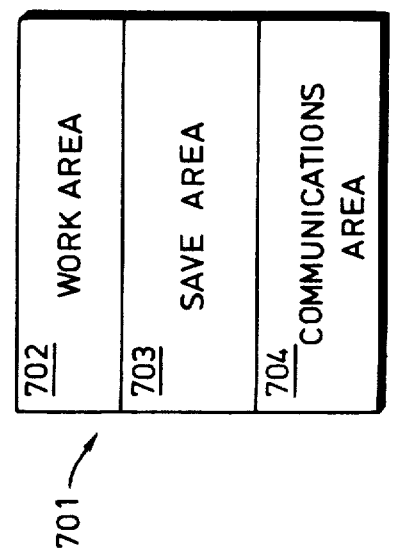

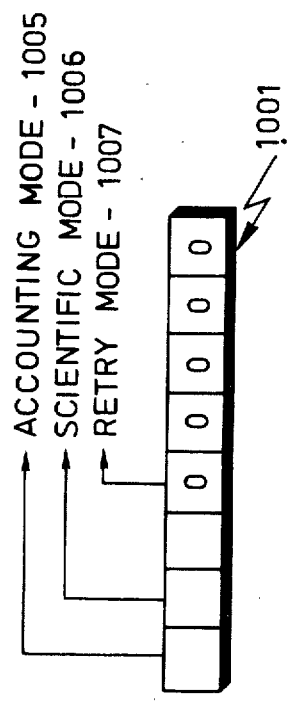
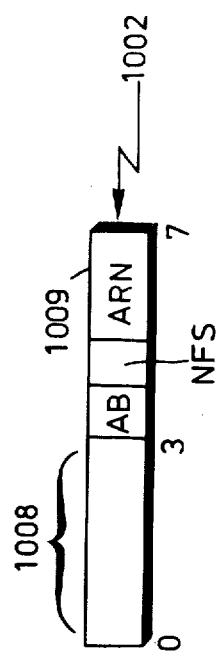
FIG. 10a  FIG. 10b  FIG. 10c

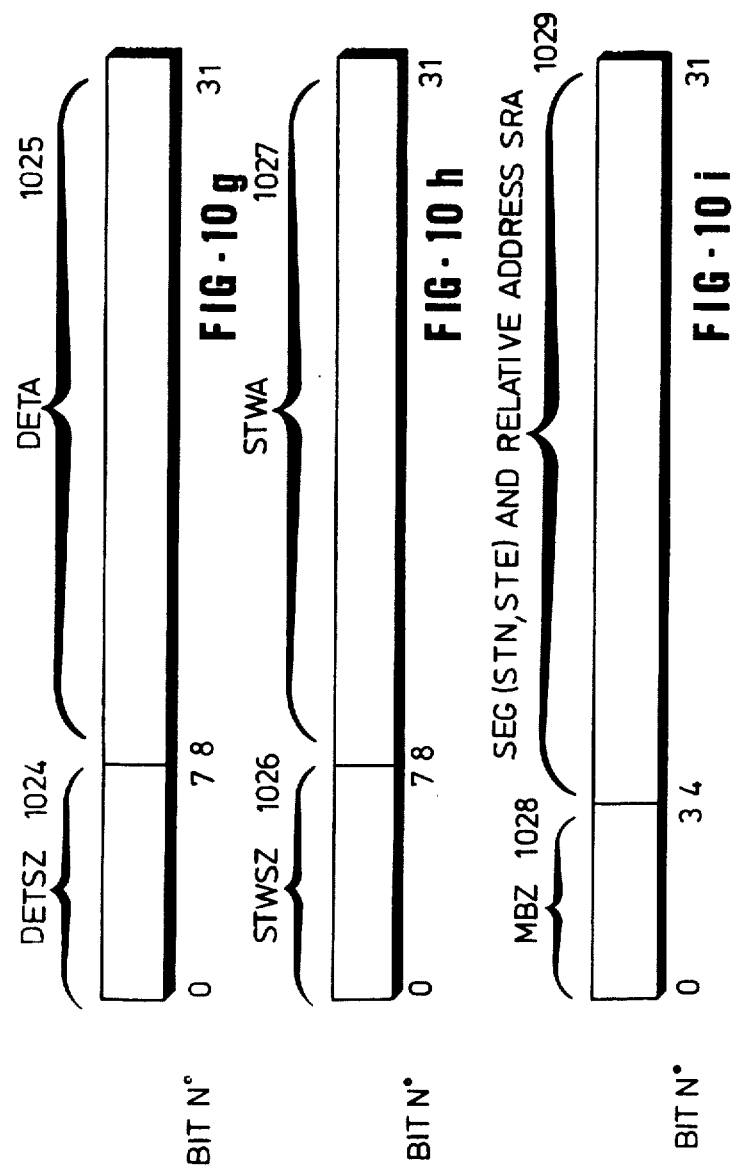

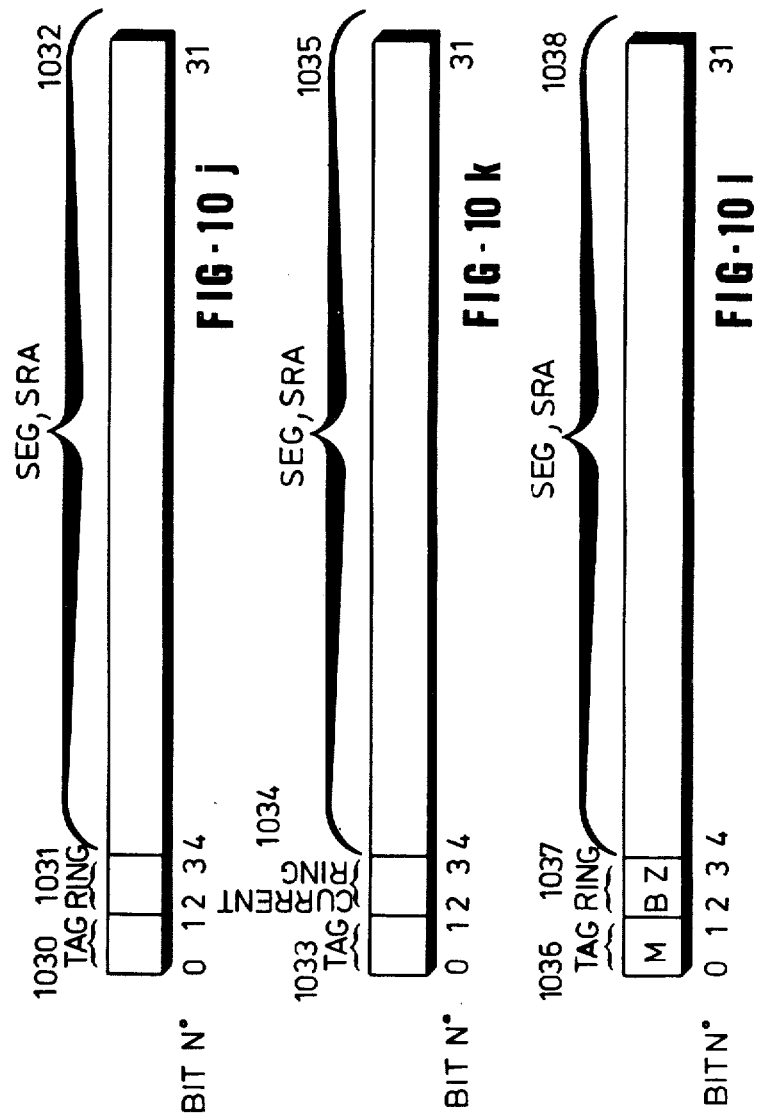

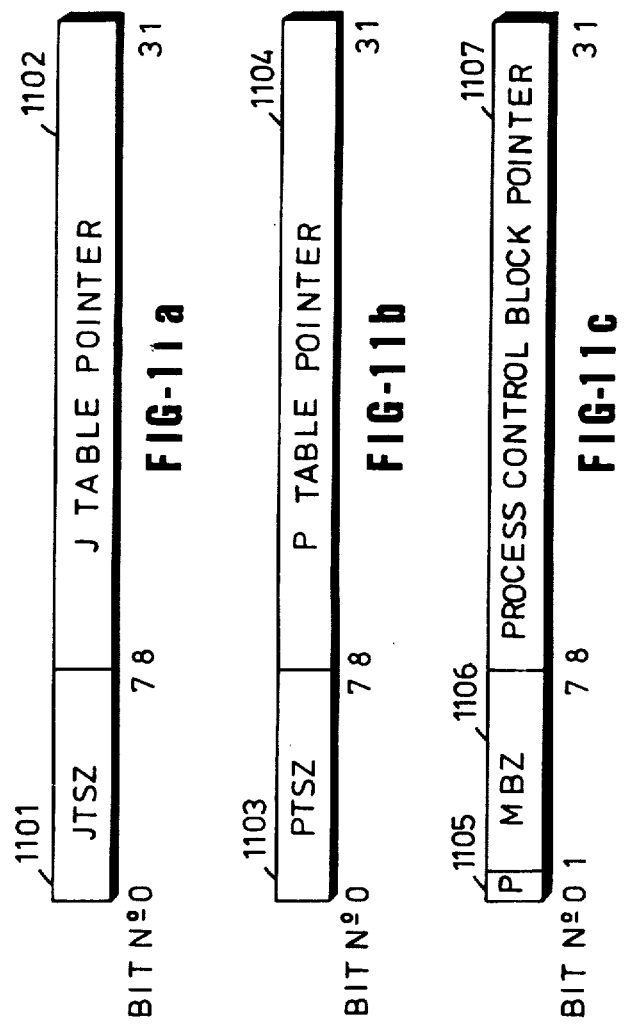

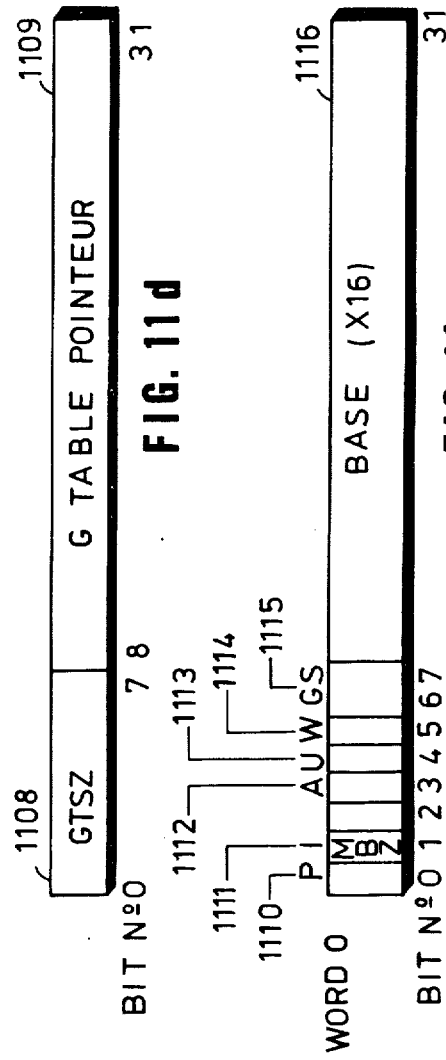
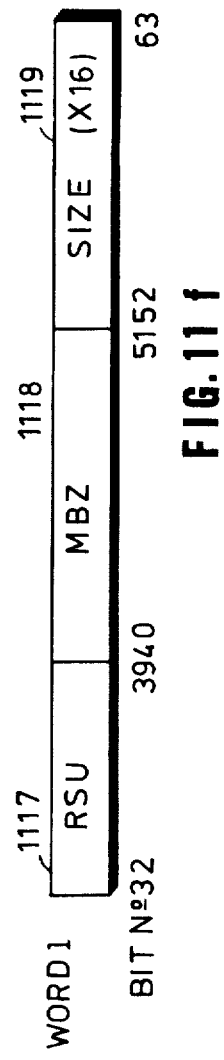
FIG. 11d
FIG. 11e
FIG. 11f

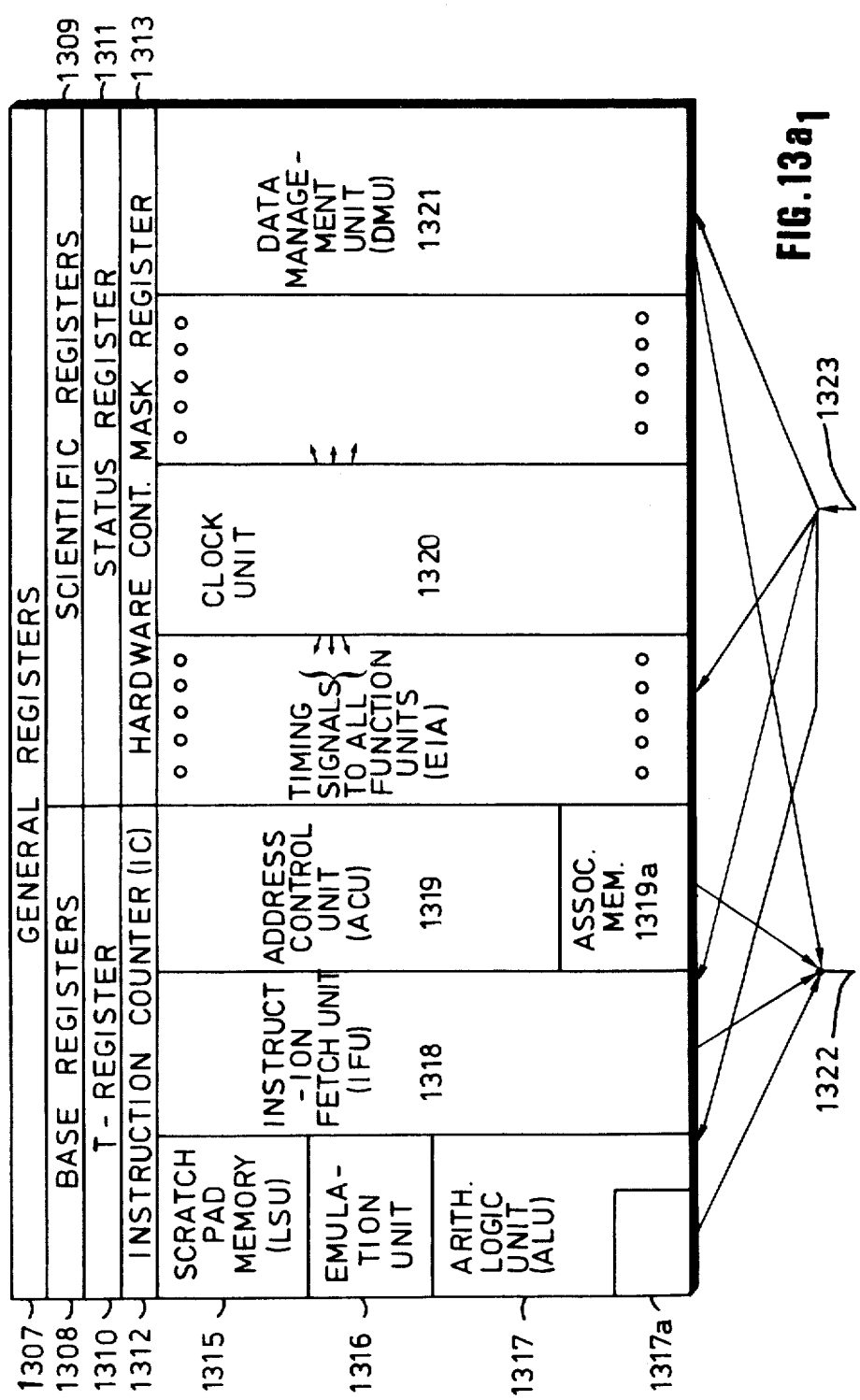
FIG.13a₁

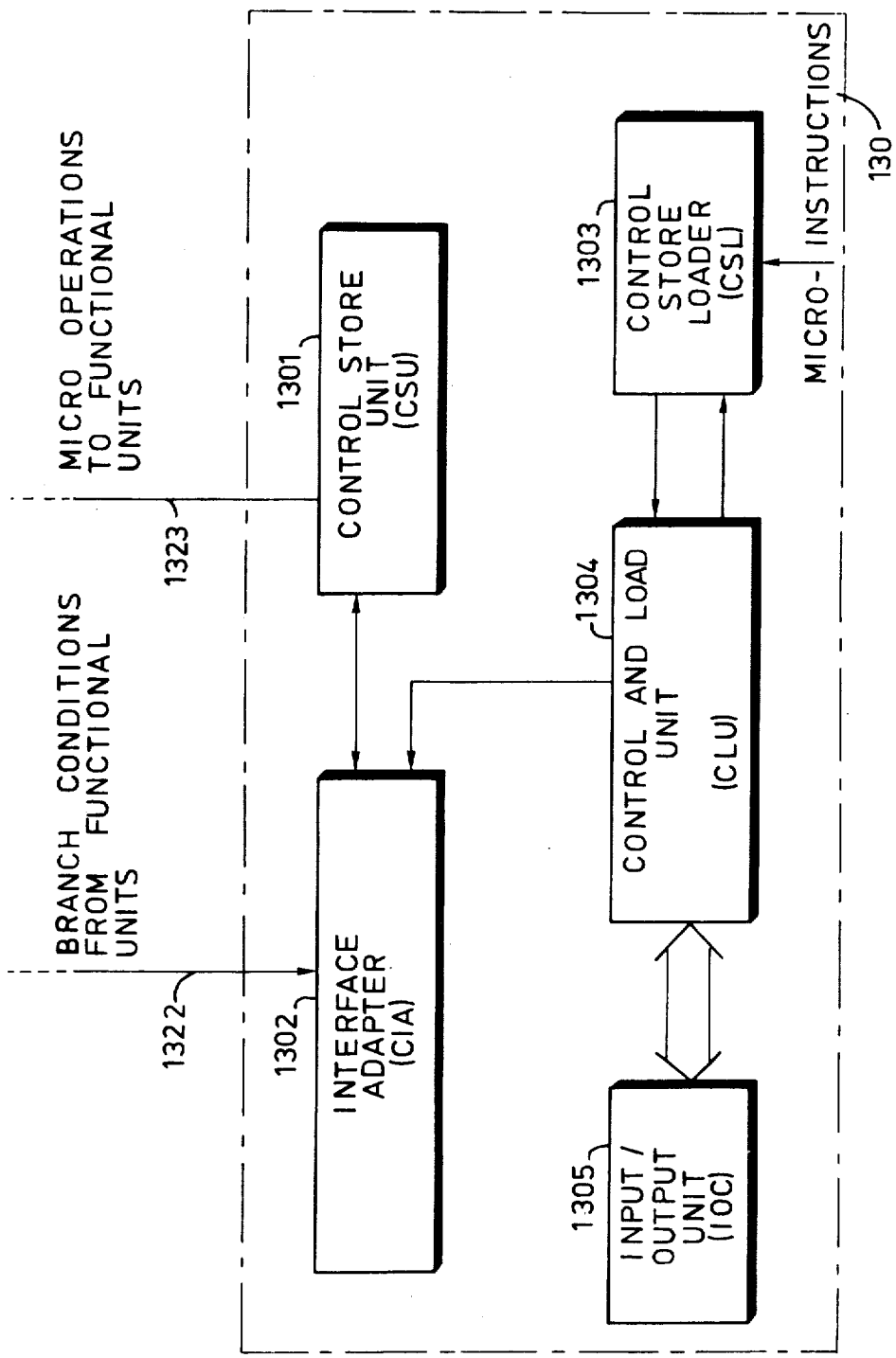
FIG. 13a₂

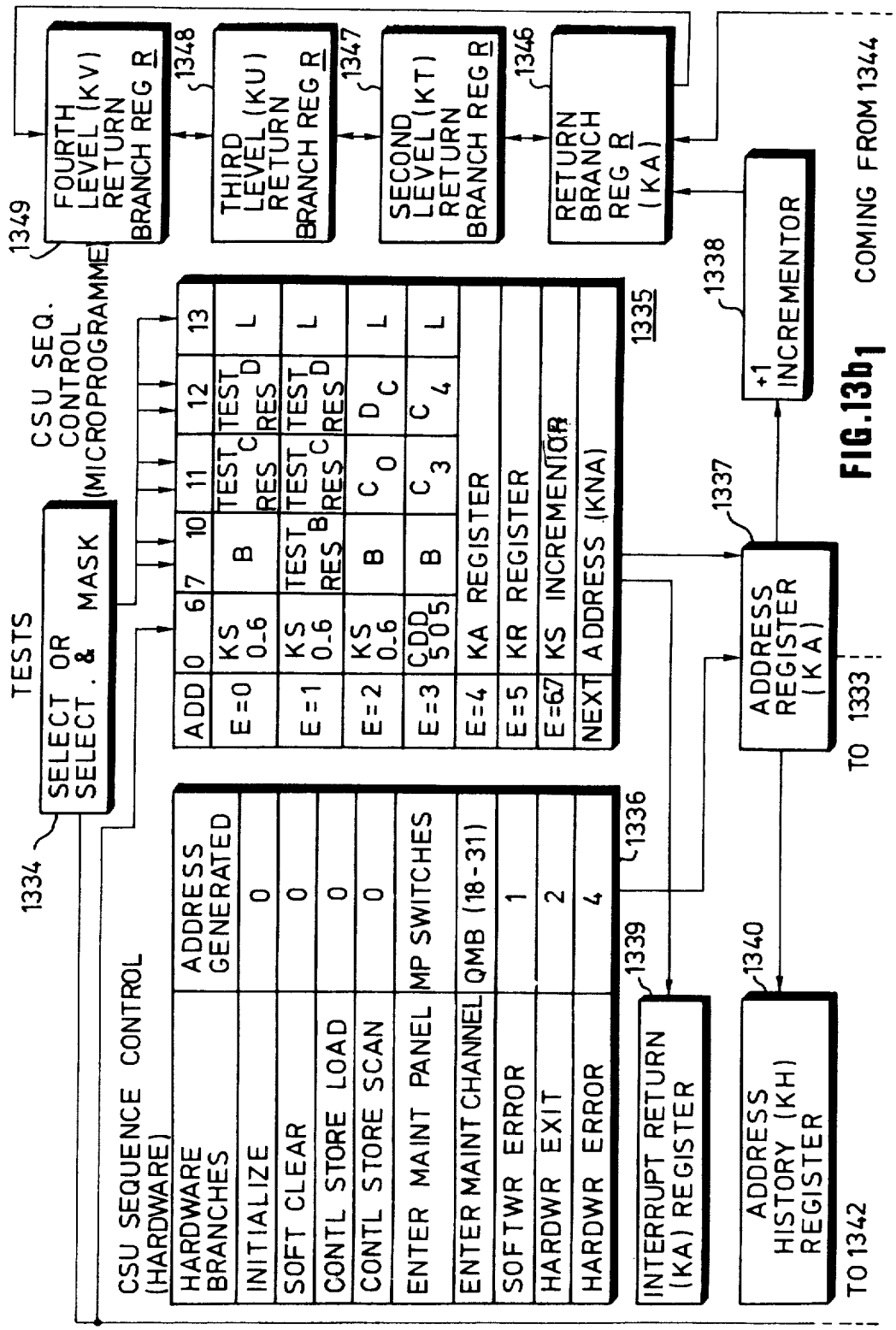
FIG.13b₁

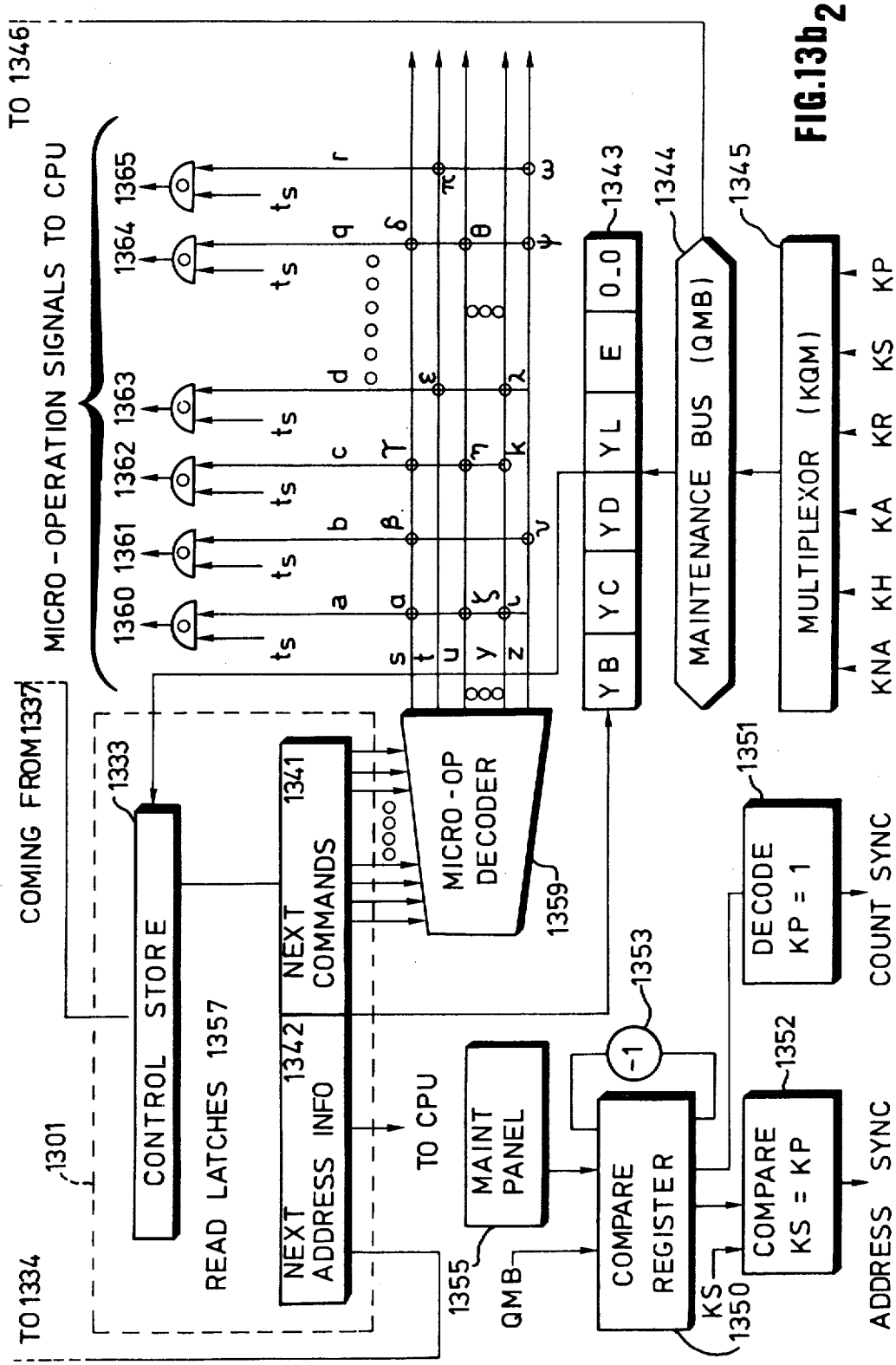
FIG.13b₂

FIG. 13c

| MAIN FIELD USES | SEQUENCE TYPE ~1326 | BRANCHING AND/OR MICRO-OPS ~1327 | | | | | CONSTANT GENERATION AND DESIGNATION ~1328 | DATA TO BUS ~1329 | | MICRO-OPS ~1330 | CHECKING ~1331 |
|---|---|---|---|---|---|---|---|---|---|---|---|
| FIELD NAME | E | A | B | C | D | E | K | QA | QB | F | P |
| BITS | 3 | 6 | 4 | 6 | 6 | 1 | 14 | 4 | 4 | 32 | 4 |
| | | 23 | | | | | | 8 | | | |

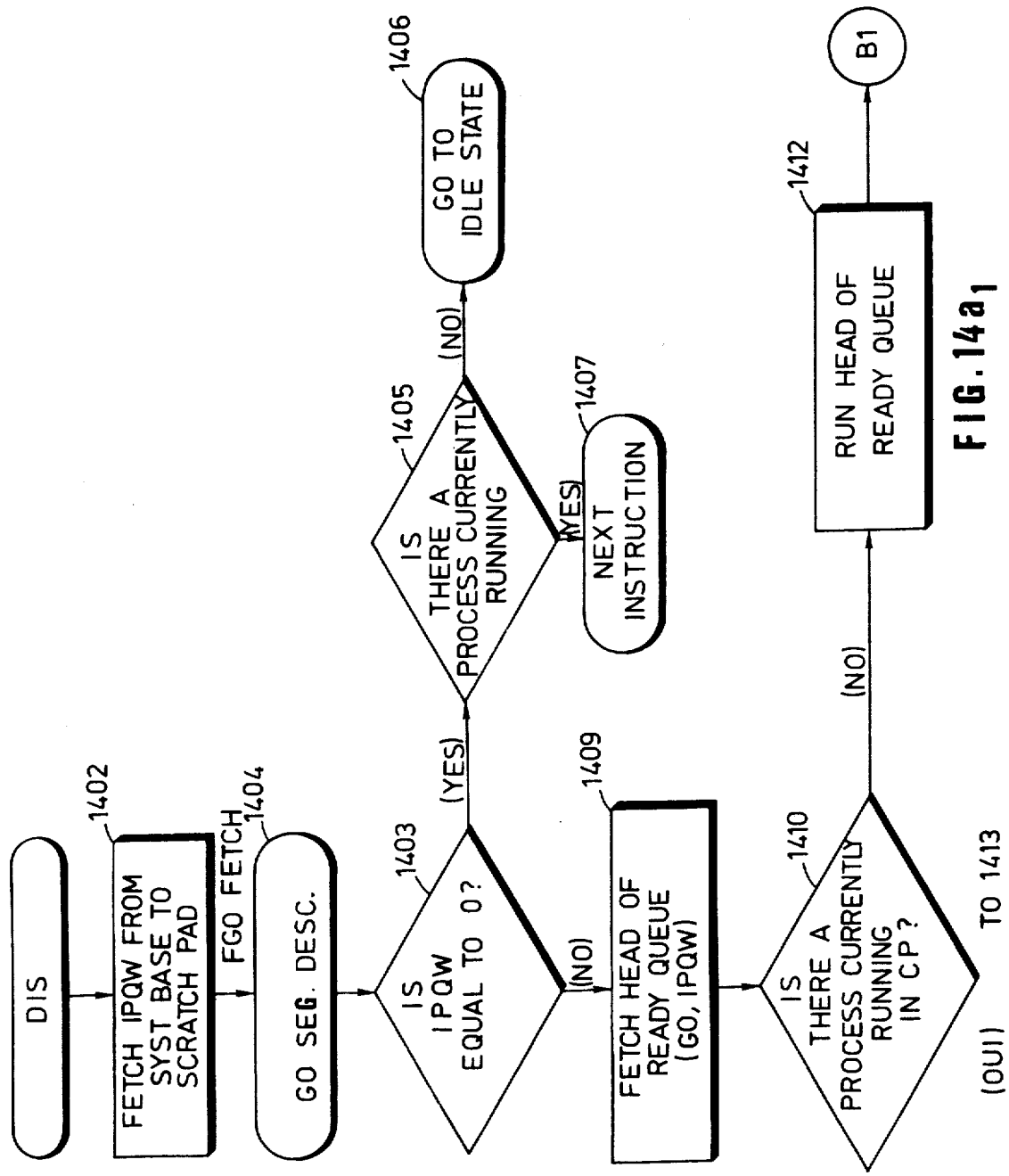
FIG. 14a₁

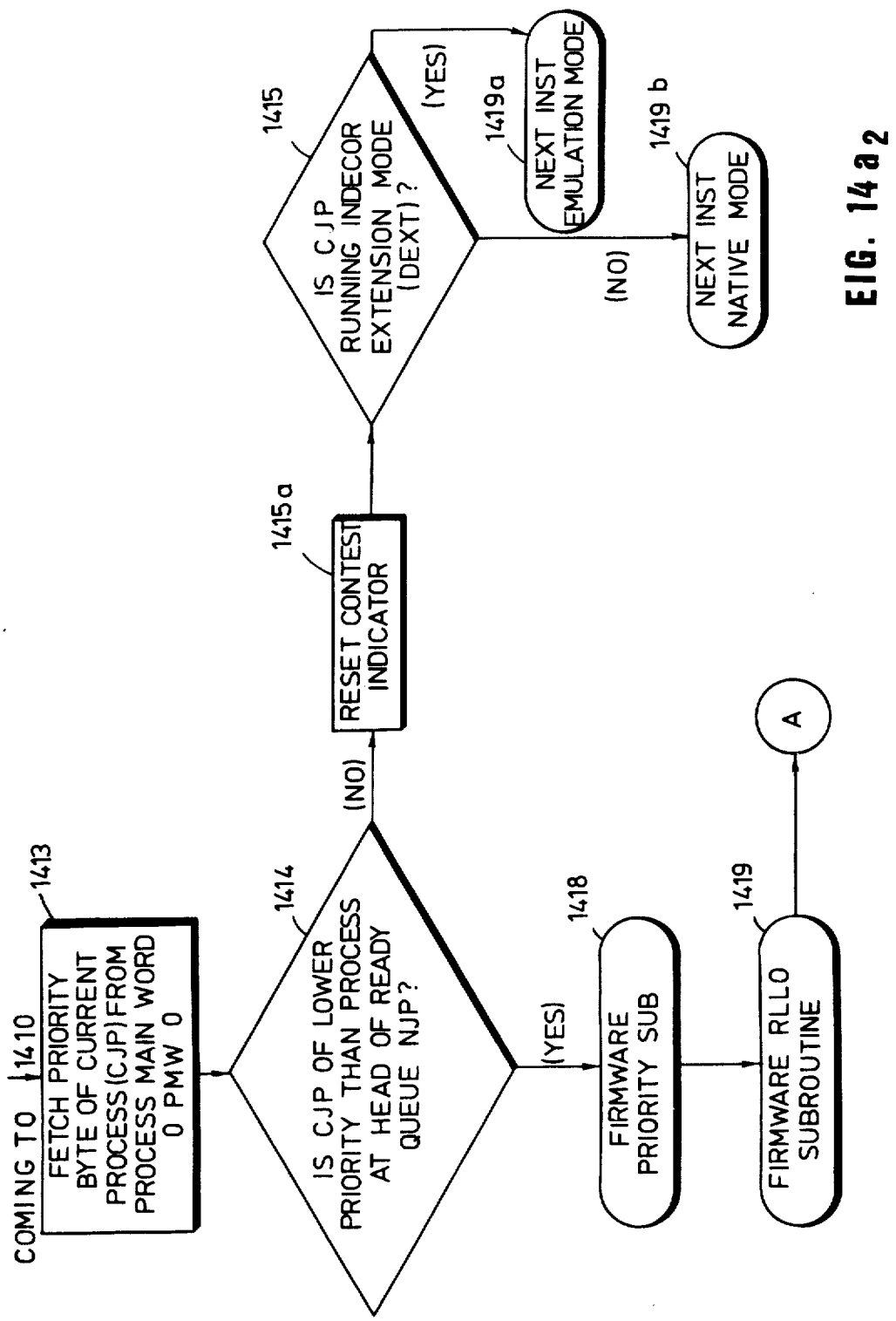
FIG. 14a₂

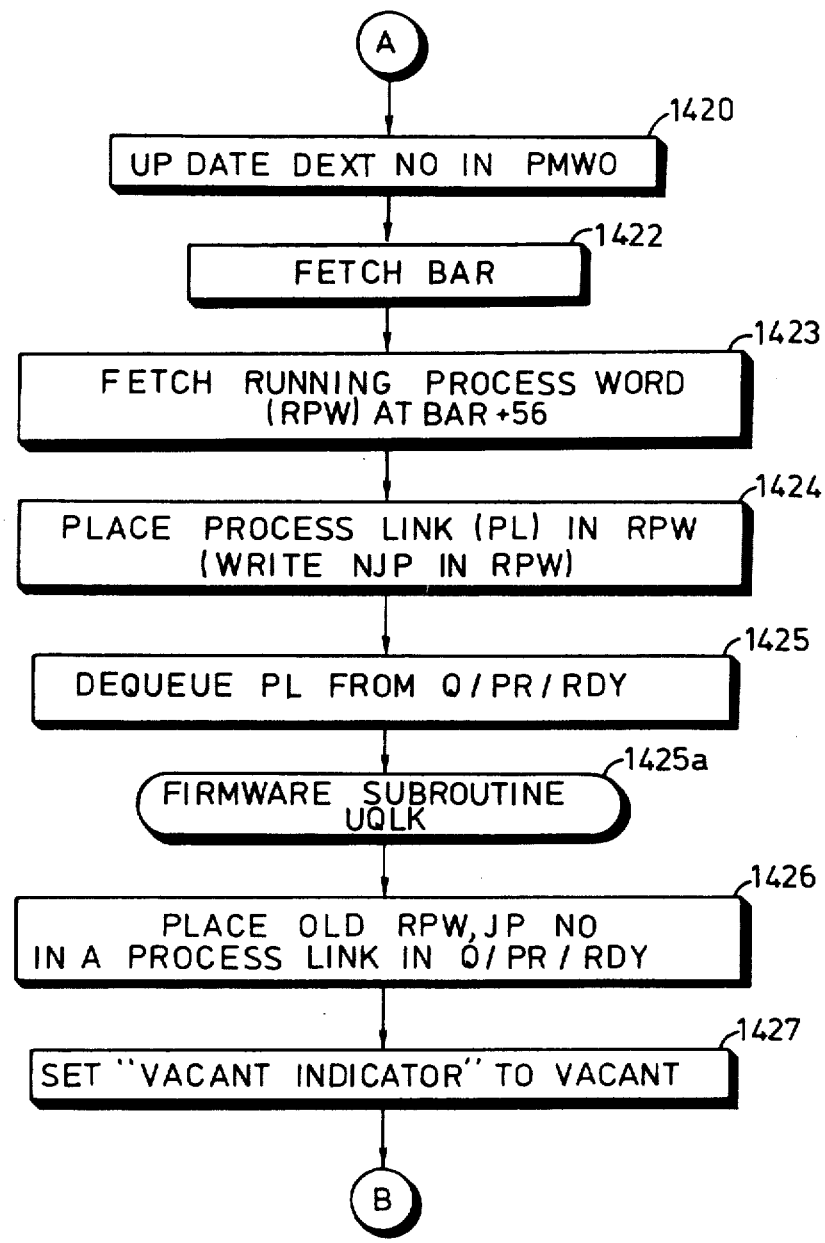
FIG _ 14b

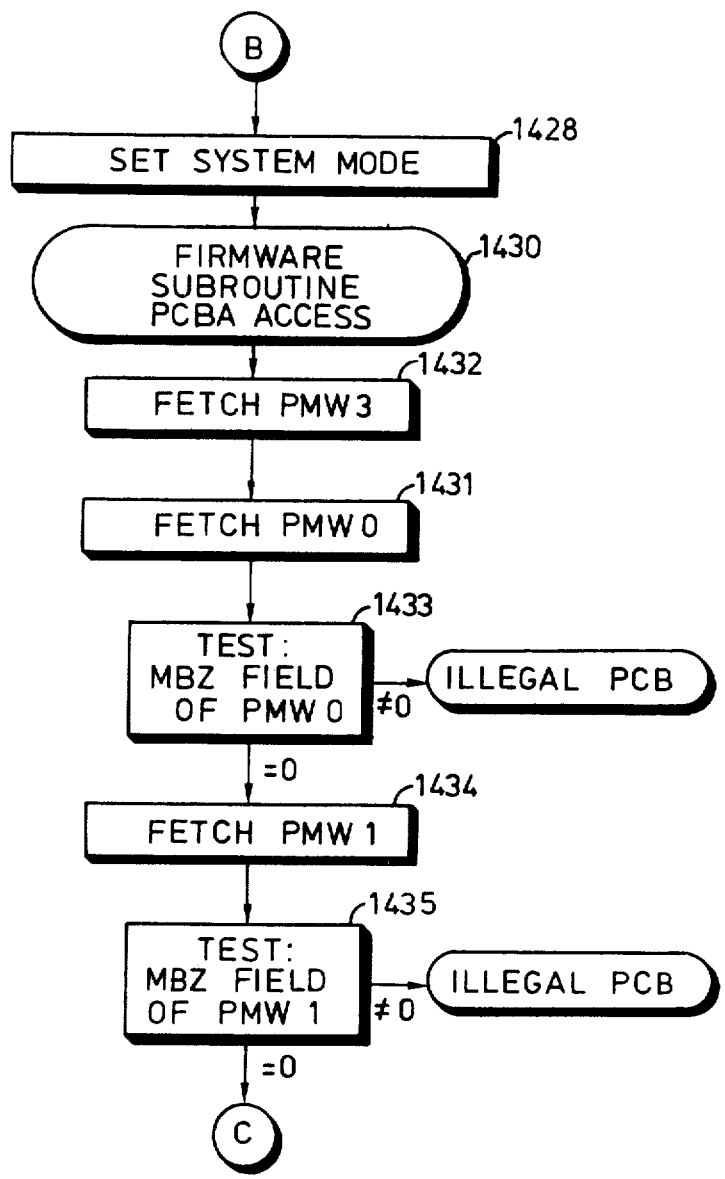
FIG _ 14c

APPARATUS AND METHOD FOR COMMUNICATION OF INFORMATION BETWEEN PROCESSES IN AN INFORMATION SYSTEM

This is a continuation, of application Ser. No. 060,161 filed July 24, 1979, now abandoned, which is a continuation of Ser. No. 911,815 filed June 1, 1978, which is a continuation of Ser. No. 570,101, filed Apr. 21, 1975, both now abandoned.

RELATED APPLICATION

Priority is claimed under 35 U.S.C. §119 based on French Application No. 74 14489, filed Apr. 25, 1974.

BACKGROUND AND SUMMARY OF THE INVENTION

The present invention refers in a general way to electronic systems for data processing and its objects include apparatus for communication of information between entities which are called processes. The concept of a process as employed in this specification is a complicated concept for although it refers to execution in sequence and in line of a series of instructions it covers both the firmware and the hardware means necessary to the execution of the sequence of instructions in question. A process is defined for the purposes of the specification and claims of the present application as the ordered execution of instructions without concurrency by either a central processor or an input/output processor. In other words, a process is the execution of a program and includes the reactions of the firmware and of the hardware to the demands of the instructions of the process.

Another object of the present invention is to enable the introduction into an information system of a trap asynchronous with the processes, that is to say, a trap such that a process A in course of execution can alert or warn a process B without the process B being put in expectation of another event. The operation known as a trap, although closely akin to an interruption is not to be confused with it. Thus an interruption enables the development of a program under way to be interrupted temporarily in order to get a program executed which is considered to have priority. More precisely the processing of an interruption generally consists, as soon as the instruction under way has finished, of safeguarding the state of the machine and then forcing into the instruction counter the address of the first instruction associated with the interruption. This program is terminated by an instruction which restores the state of the machine at the instant at which the interruption was taken into account, which has the effect of enabling the interrupted program to be resumed. On the other hand, in a trap, the program does not return to the point at which it was interrupted, but to any point in the program which is determined by the trap.

Another object of the present invention is to define a means of communication which interrupts the process only in privilege levels inside a given level. In a system to which the invention may be applied there are defined: on the one hand, privilege levels materialized by rings (see U.S. patent application Ser. No. 528,953 filed Dec. 2, 1974, now U.S. Pat. No. 4,177,510 for "Protection for the Information in an Information Multiprocessing System Putting into Effect a Concept of Rings to Represent the Different Privilege Levels Between Processes"), and on the other hand, priority levels enabling, over a period optimum management of the operations to be carried out. As will be seen later, the number of the ring defines quantitatively the nature of the operation to be carried out. Roughly speaking the operations carried out in the zero ring are functions of the system proper which cannot in any case be interrupted since there would be a risk of no longer knowing what the state of the machine is after the interruption.

The device which is the object of the present invention takes into account the privilege level at which the operations are carried out.

A device for communication of information between processes has already been described in the U.S. patent application No. 529,015 filed Dec. 2, 1972, now U.S. Pat. No. 4,394,725, entitled "Device for Synchronization of Processes by Semaphores for an Information System". In the U.S. patent application No. 529,015, communication between the processes is ensured by means of "semaphores" which are data structures contained in the central or virtual memory and which enable a process and information necessary to this process to be associated. Two types of operations were defined in this application: operation P, during the course of which a process is a purchaser of information; and an operation V, during the course of which a process is a vendor or giver of information.

The device which is the object of the present invention enables an operation of P type to be achieved by different means. The information relative to a process is contained in the central memory in what is called a process control block PCB. A control block of this kind is described in U.S. patent application No. 528,954 filed Dec. 2, 1974 entitled "Process Control Block". The PCB information is contained in words of thirty-two bits or four octets.

In accordance with the present invention, information is communicated between two processes in a multiprogrammed information system with novel apparatus and in a novel method. The system comprises: (1) a plurality of processes, one of which is "under way" and the others of which are in the "waiting", "ready" or "suspended" state, (2) at least one central memory, and (3) one central processor (CPU) communicating with the memory. The central processor is under the command of the process which is "under way." Each process is represented in the central memory by a process control block. The multiprogrammed information system also includes an exploitation system enabling processes to be created or supressed. The novel apparatus and method are characterized in that a main word of the process control block contains a number of priority bits, preferably an octet. The priority octet is arranged so that one of its bit positions indicates whether a trap is or is not to be carried out, while one of its fields indicates in which ring numbers this trap is possible. To cause the trap, means is provided to read the bit and the field as a process passes from the ready state to the state under way.

The new elements which are characteristics of the invention are set forth in greater detail in the claims appended.

DESCRIPTION OF THE DRAWINGS

The preferred embodiment of the invention insofar as its organization and operation are concerned and other aims and advantages which it displays will be more easily understood by referring to the description below in combination with the attached drawings in which:

FIG. 3 is a key to the terms employed for the storage zones reserved in the registers represented in FIG. 2;

FIG. 4 is a diagrammatic representation of a process command block;

FIGS. 7A and 7B represent diagrammatically respectively one stack segment and one stack element;

FIGS. 10a to 10l are block diagrams of the structures of the process command block (PCB);

FIGS. 11a to 11r are block diagrams of the structures of the system base;

FIGS. 13a1–a2, 13b1–13b2 and 13c constitute a diagrammatic representation of the command unit; and FIGS. 14a1 to 14i are programs of the distributor unit in firmware.

DESCRIPTION OF THE PREFERRED EMBODIMENT

Figure 1:
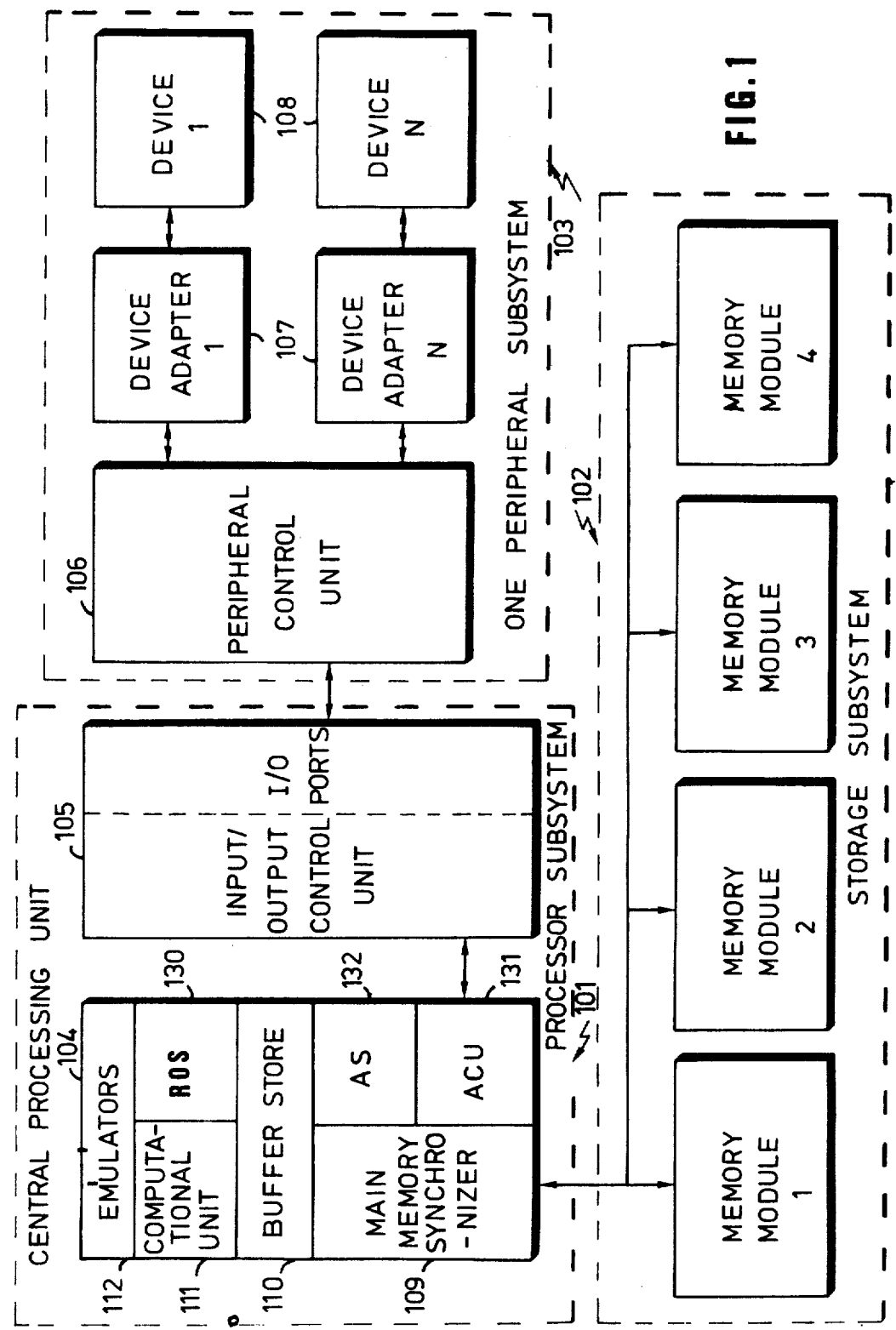
FIG. 1 is a block diagram of a multiprogramming system employing the invention.

The invention is typically employed within the scope of the hardware system described below, coordinated by a hardware/firmware/software exploitation system. FIGS. 1 and 13a represent the hardware of an exemplary data processing system, such as the Honeywell Series 60, Level 64, Model 20 or the IBM 360 Model 25. In FIG. 1, the computer sub-systems comprise the processor sub-system 101, the storage sub-system 102 or central memory and one or a number—up to 32—of peripheral sub-systems 103. The processing sub-systems comprise one central unit (CPU) 104 and up to four Input-Output control units (IOC) 105. Each peripheral sub-system consists of a peripheral control unit (PCU) 106, a certain number of device adaptors (DA) 107 and up to 256 peripherals E/S 108. The storage sub-system 102 comprises from one to four semi-conductor memory modules each containing from 32000 to 512000 octets.

I. PROCESSOR SUB-SYSTEM

In the processor sub-system 101, the central unit 104 executes the fundamental processing operations for the system and establishes the junction with the memory 102. The controller E/S 105 controls all the exchanges of information between the storage sub-system 102 and the peripheral devices 103.

A. CENTRAL UNIT (CPU)

The central unit comprises a main memory synchronizer 109, a buffer store 110, the computer unit 11, emulators 112, a read-only store command unit 130, an address control unit 131 and an associative memory 132. These elements are well known as shown, for example, in U.S. Pat. No. 3,400,371.

The main memory synchronizer 109, which is of a type shown in U.S. Pat. No. 3,449,723, issued on June 10, 1969, resolves the conflicts for the use of the main memory between the computer unit 111, the buffer store 110 and the controller E/S 105. The conflicts are resolved on the basis of priority as follows: the controller E/S has the highest priority followed by writing operations into the memory (by the computer unit) and reading operations from the memory (with transfer into the buffer store). The central unit likewise comprises the address control unit 131, of a type described in U.S. patent application Ser. No. 528,953 filed on Dec. 2, 1974, now U.S. Pat. No. 4,177,510 which controls the addressing of the main memory, and the associative memory 132 employed for storing the most recently employed addresses of the main memory. The buffer store 110 is a small-capacity, fast buffer store which reproduces a selected region of the main memory and makes the junction with the computer unit in order to reduce the average time of access to the memory. During the course of each cycle of reading from the memory, the buffer store and the main memory are both under access.

If the information to be extracted is already in the buffer store, reading from the main memory is interrupted, and the information is extracted from the buffer store. Put another way, the main memory 102 is read. Every time such reading is carried out, the central unit 101 extracts 32 octets which contain the required information. This information remains in the buffer store with a view to future references to the memory. Inasmuch as the buffer store is transparent to the software, the program controlling the computer at any given moment cannot determine whether the information it is processing has been extracted from the buffer store or from the main memory.

The computer unit 111 executes all the operations of data processing and address generation to the inside of the central unit. A command read-only store 130 provided in the computer unit (cf. the book Microprogramming: Principles and Practices. Samir S. Husson Prentice Hall, Inc.) contains the firmware which initializes the system, commands the central unit 104 and the controller E/S 105 and decodes a set of instructions (not shown). Optionally the read-only store may provide scientific instructions, test routines, emulation program assemblies or specialized characteristics which extend the capacities of the processor sub-system.

Optionally the central unit enables emulation of systems other than the present system. The emulators 112 consist of firmware, software and in certain cases hardware elements.

B. INPUT-OUTPUT CONTROLLER

The portion of the processor sub-system constituted by the controller E/S 105 establishes a data path between any peripheral sub-system 103 and the storage sub-system 102. This data path enables the getting under way of the peripheral commands and commands the resultant data transfers. One controller E/S can control up to 32 channel control units (not shown). E/S controller 105 is of a type shown in U.S. Pat. No. 3,400,371.

C. PERIPHERAL SUB-SYSTEM

In a peripheral sub-system 103 (FIG. 1) the peripheral control unit (PCU) 106 is an independent microprogrammed processor of a type shown in U.S. patent application Ser. No. 566,024 and in U.S. Pat. No. 4,103,328, both assigned to the assignee of the present invention, which lightens the load on the central unit 104 by commanding the devices E/S 108 during the course of input-output operations. The peripheral control unit 106 fulfills this function by executing instructions contained in a channel program. This program has as its result the execution of arithmetical, logical, transfer, lag and branching operations in the peripherals control unit. There are a number of types of peripheral control units as a function of the type of device which each commands, namely, conventional registration units, bulk stores (with discs), magnetic tape units, communication systems, etc. . . .

The device adapters 107, which are of a type shown in U.S. Pat. Nos. 3,573,741 and 3,680,054, serve as intermediary between each of the peripherals control units and the devices which it commands. Each adapter contains the firmware and the logic necessary to effect communications with a particular type of device. Depending on the type, one adapter 107 commands one or a number of devices.

The main functions fulfilled by a peripheral sub-system 103 are the following:

1. To transform the instructions of the central unit into a series of commands acceptable to the appropriate peripheral device.
2. To condense and decondense the data into the form required by the central unit or by the appropriate peripheral device.
3. To keep the central unit informed of the state of the sub-system and the device under its control.
4. To issue and process independently error procedures and procedures for reestablishment after errors.
5. To enable direct diagnosis of a device without disturbing the capacities for sharing between the devices of the associated peripheral processor.

A peripheral control unit resolves the conflicts for access to the main memory between the devices which are connected to it, while the controller E/S resolves the conflicts between the peripheral control units.

D. STORAGE SUB-SYSTEM

Each of the memory modules 1 to 4 has a width of 4 to 8 octets. The number of modules, their dimensions, and the width of the data path may vary depending upon the dimensions of the computer. The memory modules are imbricated four ways so that there is access to the four modules in sequence (Module 1 contains the first 8 octets, Module 2 the next 8 octets, etc. . . . ). The imbrication or interlacing reduces the number of conflicts for access to the memory and thus reduces the mean access time to the memory. The memory can be remodelled in the event of failure, that is to say, blocks of memory contained in a module can be withdrawn without destruction of the continuous addressing.

The main memory 102 consists of a capacitive storage medium in the form of microplatelets MOS (metal-oxide-semiconductor). This medium operates on the principle of regeneration in order to preserve the information. Each memory location is regenerated at least once every millisecond. The concept of the system ensures that few conflicts are produced between regeneration times and admissions to the memory (in case of conflict, regeneration has priority).

A zone located at the start of the main memory is reserved for the hardware and the firmware. The upper boundary of this zone is defined by the contents of a boundary address register BAR (which will be described below) which is visible through the software. The contents of the register BAR is fixed at the time of initialization of the system. The memory zone underneath the specified address in the register BAR may contain Input-Output command tables (IOC) which define the configuration of the peripheral sub-systems, the firmware for command of the central unit (CPU) or microprograms and tables for the emulation. The size of the zone located underneath the specified address in the register BAR depends upon the configuration of the system. The fact whether the microprograms are in the main memory or in the read-only store (command store) depends upon the configuration of the system and the applications executed by the system.

II. BASE STRUCTURES OF THE MACHINE

There are typically three base data structures employed in this hardware, the data formats, the registers visible to the software and the instruction formats.

A. DATA FORMATS

Information is transferred between the memory and the central unit by multiplets of 8 bits in parallel. Each information unit of 8 bits is called an octet. Parity data or error correction data are likewise transferred with the data, but they cannot be modified by the software. Consequently, in this description, the term data excludes the associated parity or error correction data.

B. OCTETS

The bits inside an octet are numbered from 0 to 7 from left to right. The octets are processed separately or in groups. Two octets constitute a half-word, 4 octets a word, 8 octets a double word, 16 octets a quadruple word. These are the basic formats employed for all the data including the instructions.

C. REPRESENTATION OF DATA

All the data are in binary form but may be interpreted as binary, decimal or alphanumerical data. The data bits are interrupted by groups of four as data in decimal-coded binary, by groups of eight as alphanumerical data or by groups of 16 to 64 as binary numbers. The latter are interrupted as numbers of given sign, with a fixed or floating point, in binary notation. Any number of adjacent bits up to the value of a double word may be manipulated as a chain. The set of alphanumerical characters is represented in EBSDIC code. The ASCII code can be employed as another exchange code.

D. OCTETS ADDRESS

The locations of octets in the main memory are numbered in succession from zero. Each number is the address of one octet. A group of consecutive octets is said to be aligned on a halfword, a word, a double word or a quadruple word if the address of the octet from the left of the group is respectively a multiple of 2, 4, 8 or 16. Every time a half-word, a word, a double word or a quadruple word is so aligned, this unit can be extracted at this address. The location of the data in the main memory is specified by a data describer to which access is gained indirectly during the course of the address development (cf. French Patent Application No. 73 17765 filed on the 16th of May, 1973 entitled: "Address development and calculation device in a segmented store").

E. VISIBLE REGISTERS

Figure 2:
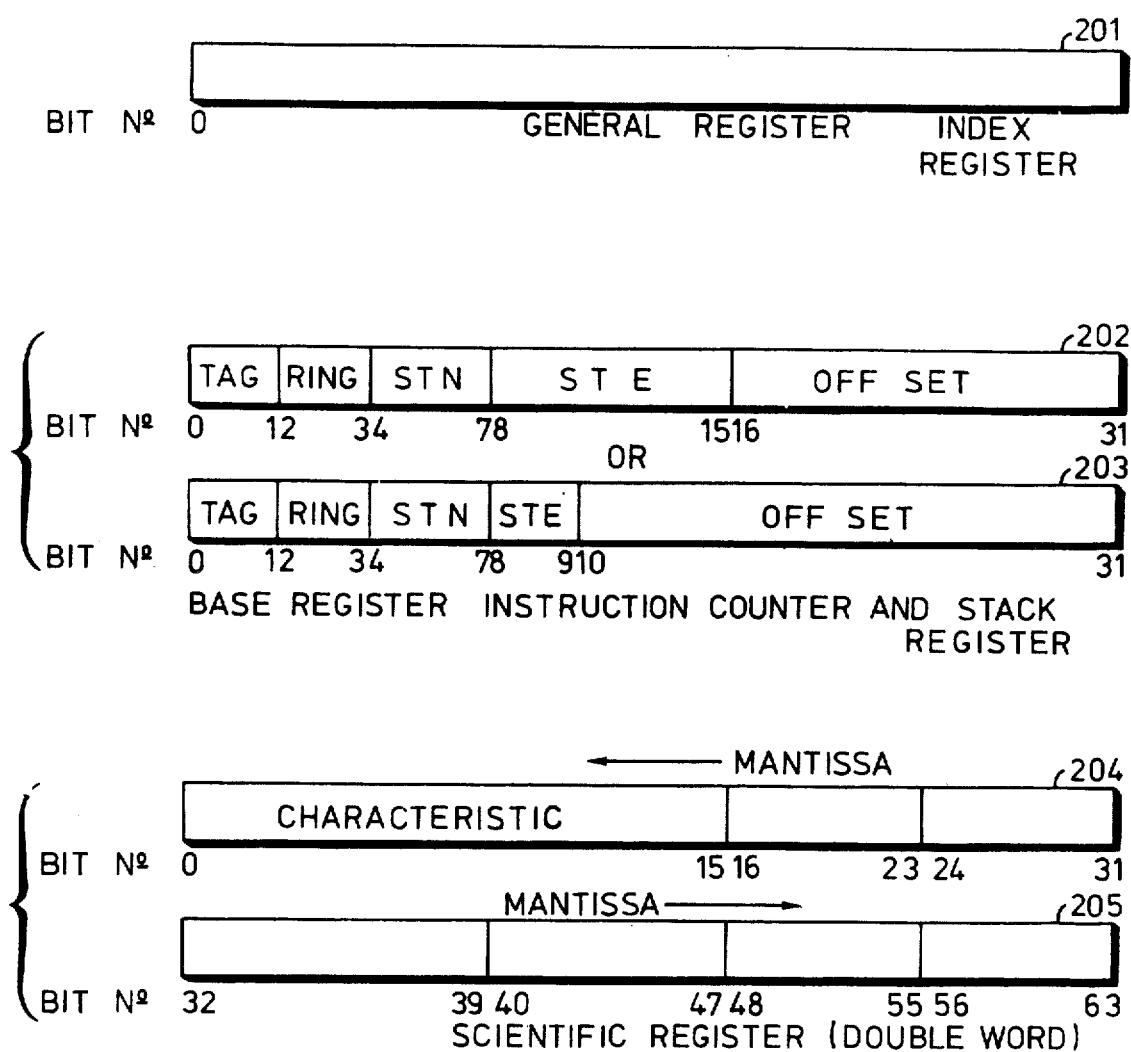
FIG. 2 is a diagrammatic representation of various register structures employed by the invention.

There are 33 registers visible to users in the central unit 104 (FIG. 1) the contents of which collectively define the state of the central unit. These registers are of four types (ct. FIG. 2):

1. General registers.
2. Base registers.
3. Scientific registers (optional).
4. Sundry registers.

F. GENERAL REGISTERS

The general registers (GR) 201 are employed for manipulating binary numbers with fixed point and chains of bits. There are typically 16 general registers of 32 bits in the central unit 104 designated respectively GR0 to GR 15. The general registers GR8 to GR15 are likewise employable as index registers. When they are employed as index registers they are called here registers X0 to X7. Indexing is carried out by employing the whole number in complement with two of 32 bits contained in one register.

G. BASE REGISTERS

The base registers have the same format 202-203 as the instruction counters IC and the stack registers. The base registers are employed in the course of the address calculation in order to define one portion of memory. There are typically eight base registers of 32 bits designated respectively BR0 to BR7.

H. SCIENTIFIC REGISTERS

The optional scientific registers (SR) are employed for making calculations upon binary numbers with floating point. There are typically 4 scientific registers of 8 octets which are designated SR0-SR3. The scientific registers have the format 204-205 represented in FIG. 2.

I. SUNDRY REGISTERS

There are five other registers:
The instruction counter which has the format 202-203;
The state register which has the format 207;
The stack register (called Register T);
The boundary address register (BAR) which has the format 206; and
The material control mask register which has the format 208.

The instructions counter (IC) is a register of 32 bits which contains the address of the instruction in course of execution. The state register (STR) 207 is a register of 8 bits which registers facts concerning the process in course of execution, for example, if the exceeding of low capacity has been caused by the most recent operation. The stack register likewise called Register T is a register of 32 bits which contains a pointer designating the top of a stack associated with the procedure in course of activity. The stacks which will be described below supply a working space and a mechanism for safeguarding the local variables and preserving the entry of the process and the return information. The boundary address register BAR 206 is a register of 28 bits which specifies the lowest absolute address of the memory, which is accessible to the software. This register is loaded during the initialization of the system and can only be read by the software. The material control mask register 208 is a register of 9 bits which registers information on the state of the machine.

J. INSTRUCTION FORMATS

There are approximately 200 instructions although a larger or smaller number may be employed. Each instruction has one of four different lengths but it always consists of an even number of octets. The instructions are stored in consecutive memory locations. The address of the extreme lefthand octet is a multiple of 2 and is the address of the instruction.

The most significant eight bits (and in certain cases bits 8-11 or 12-15) of an instruction represent the operational code while the remaining bits represent one or a number of factors. A factor may be a register pointer, a displacement pointer, an address syllable (logical address of a literal value), or an immediate literal value. The type and number of factors are determined by the instruction format.

III. SYSTEM ORGANIZER

A. JOB AND TASK STAGE

The job which is to be executed by the computer system is defined externally by a series of job stages by means of a job command language. A job stage is a job unit to which the resources of the hardware are assigned. Typically one job stage consists of a number of tasks. A task is the smallest unit of a job defined by the user which consists of a stream of instructions executed without parallelism.

B. PROCESSES

The task and job stage concepts visible to the user are respectively represented in the hardware by a process and a group of processes. A process is defined as being an orderly sequence of instructions which can be executed asynchronously by the central unit, that is to say, a number of processes may be active and share the resources but only one process is actually in course of execution at any given instant. A group of processes is an associated assembly of processes necessary to the execution of one job stage.

C. PROCESS COMMAND BLOCK AND SYSTEM BASE

Because the processes may abandon command of the central unit at various points in the course of their execution, a storage zone of the main memory is put at the disposal of a process for safeguarding the state of the central unit. This state information is employed for preconditioning the central unit before a process resumes command of the central unit.

The storage zone assigned to a process is called a process command block (PCB) 400 (FIG. 4). The data contained in a process command block comprise the addresses of the memory zone (address spaces) assigned to the process of the contents of all the relevant registers and the state of the process. Thus a block PCB serves the temporary storage zone of the information necessary to setting under way or restarting a process without loss of information. Each block PCB is accessible through the hardware and may be addressed by the exploitation system by means of a group of tables of the hardware microprograms established during the course of initialization of the system and modified during the course of operation of the system (FIG. 5).

Figure 5:
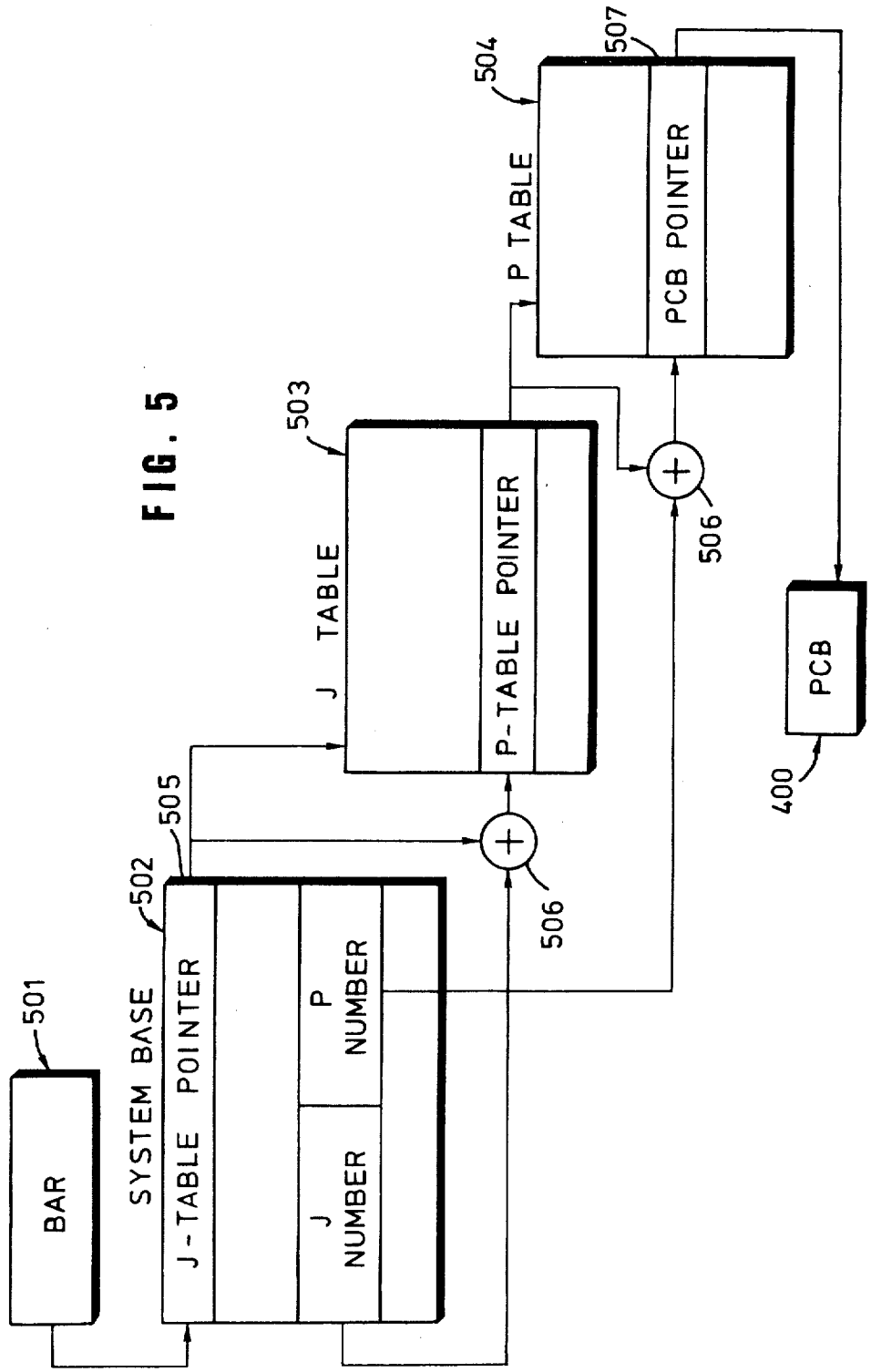
FIG. 5 is a diagrammatic representation of a system employed for addressing a process command block.
Figure 6:
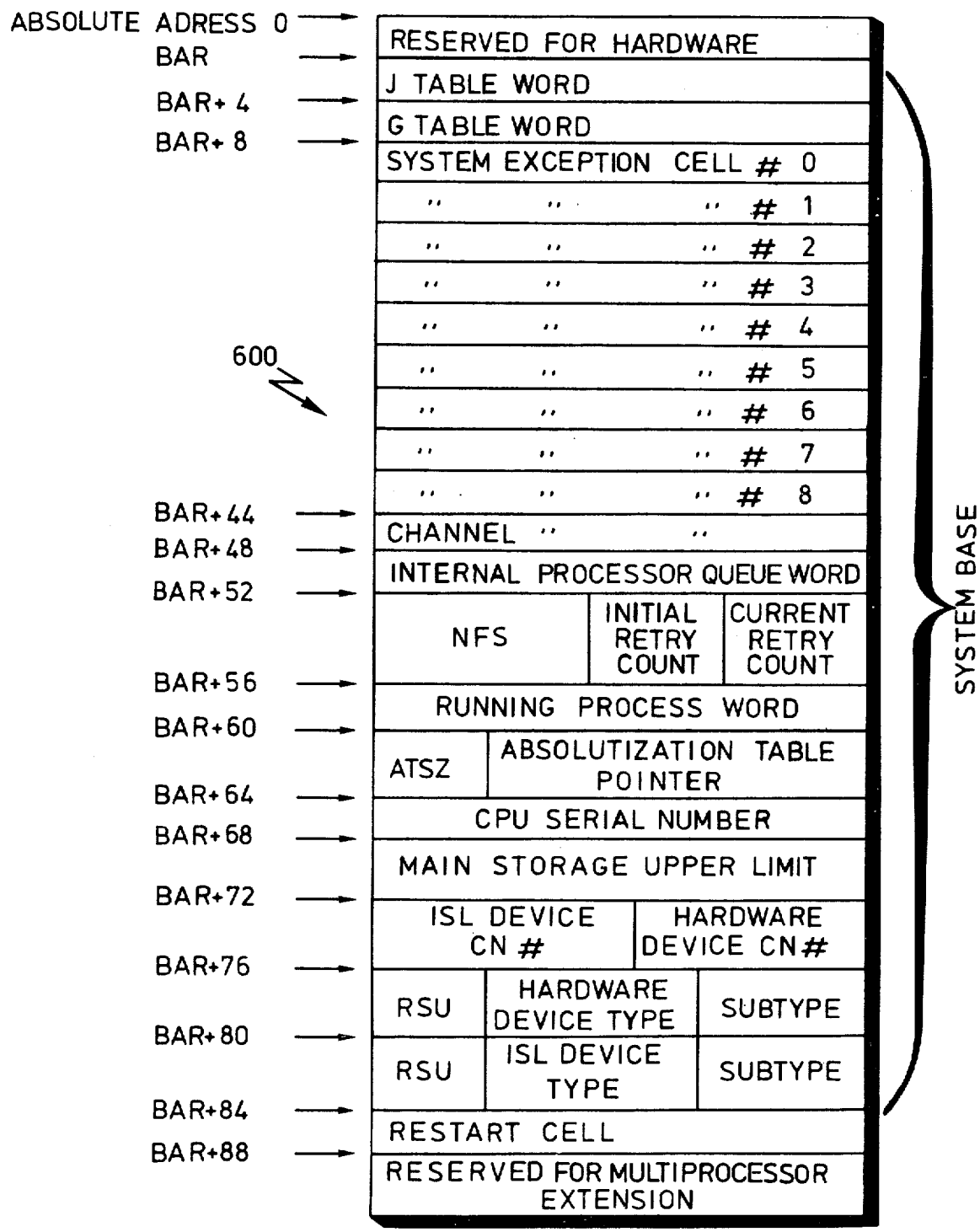
FIG. 6 is a diagrammatic representation of the base of the system of the invention.

There is one absolute zone of the main memory which is called the base of the system 502 (FIGS. 5 and 6). This zone is established by the firmware and is accessible by way of the boundary address register (BAR) 501 which can be read but not modified. The base of the system 502 contains a certain number of attributes of the system among which is a logical name (J, P) for the process in course of execution. Another attribute of the base of the system is a pointer designating a data structure defined by the hardware called table J, 503. This table contains an entry for each of the job stages which are in the system. Each entry in the table J designates a corresponding table P which is likewise a data structure defined by the hardware. This table defines a process group and contains an entry for each process of the process group. Each entry of the table P designates a block PCB 400.

In FIG. 5, to which reference will be made, the pointer of the table J 505 indexed by the number J, by way of the computer unit 506, gives access to an entry of the table J 503. This entry contains a pointer of the table P which, when it is indexed by the number P by way of the computer unit 506, gives access to an entry of the table P 504. The entry of the table P contains a pointer 507 designating the block PCB of the process in course of execution. Thus the exploitation system can gain access to the block PCB by employing the contents of the register BAR 501 and can gain access to any other block PCB the logical name (J, P) of which is given to it.

D. SEGMENTATION OF THE MEMORY

Within this compass of multiprocessing as described here there are at any moment a number of processes contained in the memory. These processes may vary as far as their size is concerned and their memory needs, which brings about problems of assignment of the memory. The hardware described here in cooperation with a system of exploitation (which has not beeen shown here) solves this problem by dynamic assignment of the memory space. Because of the chancy nature of the memory needs, the memory is assigned in segments of variable size, and the assignment of the memory may be restricted during the course of the period when the process is passing through the machine. Thus, there may be assigned to a process a certain number of non-contiguous memory segments. This method of assignment of the memory is called segmentation.

Segmentation poses a supplementary problem in the sense that the addresses in memory must be modified every time one portion or the whole of a process is transferred. In order to solve this problem, the system described here employs a technique thanks to which the addresses employed by a process are logical addresses and not the absolute addresses in the main memory. The logical addresses are employed for developing the absolute addresses.

Segmentation likewise enables each process to have access to its own memory segments or to allied segments by means of a segments describer system. By gaining access to a segment describer, a process can obtain the address of a segment. The segment describers are contained in the main memory and are maintained by the exploitation system.

Every process can have access to up to 2068 memory segments; normally, this would necessitate a like number of segment describers per process. However, inasmuch as segments may be shared, the exploitation system groups the segment describer in segment tables. This grouping is based on the accessibility by a process (task), by a process group (job stage) or overall accessibility (the whole of the sytem). Each process may have up to 15 segment tables cooperating with it. This technique necessitates only one segment describer for each segment to which access may be gained by a process by means of a segment table. Thus, the memory stage necessary to the segment describers is reduced, bringing to light of the memory during the course of the transfer is reduced and a certain protection of the program is provided. (The main system of protection of the program is the system of rings).

A process must be capable of determining which are the segments to which it has right of access. Consequently the system gives the process two segment table word tables (STWA). These tables contain the addresses of all the segment tables accessible to a process. There are two segment table tables accessible to a process. There are two segment table tables per process because there are two sizes of segments, large segments and small. The large segments have a maximum size of $2^{22}$ octets, and the small segments have a maximum size of $2^{16}$ octets. All the segments vary in size by increments of 16 octets up to the maximum. A system may typically contain up to 28 large segments and 2040 small segments.

The segment table word tables STWA can be transferred by the exploitation system; consequently a process must know the absolute address of its tables STWA. The blocks PCB of any process contains two words which comprise this information and which are called address space words ASW1 and ASWA2 in FIG. 4. Each word designates a segment table word table STWA. The exploitation system brings to light the contents of the words ASW every time the corresponding tables STWA are transferred. The operation consisting in following the chain of pointers and decoding the segment describer is a function of the firmware and thus once undertaken is not visible even to the exploitation system.

The segmentation defines more than 200 million address space octets as being available to the process. This number exceeds the capacity of the main memory, consequently an auxiliary memory (magnetic discs or drum) is employed in combination with the main memory. The exploitation system creates the illustion that the system has a main memory much larger than that which is really available. This concept is called "virtual memory".

At any given instant a particular segment may or may not be materially in the main memory. The contents of a segment describer indicates whether the corresponding segment is or is not in the main memory. The hardware detects any attempt carried out by a process to gain access to a segment which is not in the main memory and notifies it to the exploitation system. The exploitation system causes the loading of the required segment from the auxiliary memory into the main memory. Next, the exploitation system places the memory address of the segment in the segment describer which is the only place where the absolute address of a segment can be found. This operation is invisible to the process and so it is not warned that the segment was not in the main memory or that it may have been transferred into the main memory.

The computer system described here provides protection of the data and procedures by preventing the process from interfering with one another or sharing their address spaces in an unauthorized manner. This protection is achieved by restricting the addressability by means of the segmentation of the memory and by a system of rings.

The segment tables isolate the addressed space of the various processes contained in the system. The processes still employ a segmented address during the course of the execution. A segmented address consists of a segment number and an address relative to the inside of the segment.

The hardware checks that the address employed by a process forms part of the address space assigned to the process. If the address is outside the prescribed address space, an exception is produced. A process cannot make any reference to data contained inside the address space of another process because the material employs the segment tables of the process which has emitted the reference. So there is no possibility that a process or a group of processes can refer to an entity belonging to another group of processes.

Generally an overlapping of address space in the system is produced for those of the segments which are shared by all the processes. These "public" segments are created by the program of the system which carry out a verification in order to give a guarantee with regard to the risks of conflicts of address. So the segmentation protects the user programs with respect to one another and protects the exploitation system with respect to the user programs.

The segments shared by a number of processes are not protected with regard to erroneous uses by one of these processes. In order to solve this problem, a system of rings is employed according to which the procedure and data segments are grouped in a hierarchy having four classes. The four classes of rings are numbered from 0 to 3.

Each ring represents a privilege level of the system, the level 0 (the innermost ring) being the most highly privileged and the level 3 (the outermost ring) the least. With each procedure of the system are associated minimum and maximum execution ring members which specify which can call for the procedure. A procedure is a sub-program which is capable of calling for other procedures and transmitting parameters to them.

The general rules of the ring system are the following:

1. A procedure in an inner ring has free access to the data in an outer ring. On the contrary a procedure in an outer ring cannot have access to data which are in the inner ring.

2. A procedure in an outer ring can carry out a branching onto a procedure in an inner ring but the converse is not allowed.

3. To each segment containing data are assigned two ring values, one for reading (RD) and one for writing (WR). These ring values specify the maximum ring value in which a procedure can execute when it gains access to the data either in the writing mode or in the reading mode. Every time a procedure instruction is executed, the ring number of the procedure (effective address ring EAR) is checked with respect to the ring numbers assigned to the segment containing the data being referred to. The effective address ring EAR is the maximum number of the ring numbers contained in the base register and the data describers present on the addressing path. Access to the data is granted or refused on the basis of a comparison of the ring numbers. For example, if a table of the system exists in a segment having a maximum reading ring value of 3 and a maximum writing ring value of 1, a user procedure executing in the ring 3 can read the table but cannot bring it to light.

By construction, the rings 0 and 1 are reserved to the exploitation system and the rings 2 and 3 are reserved to the user. The ring 0 contains those of the segments which are critical to the operation of the system as a whole. The ring 1 contains the bulk of the segments of the system, failure of which would not be catastrophic and would enable re-establishment. The user can employ the ring 2 for programs which have been perfected and ring 3 for programs in course of being perfected.

F. PROCEDURE CALLS

The procedure call is an important function in the system described here. Procedure calls are employed in order to pass from one procedure to another in order to enable user procedures to employ the services of the exploitation system and in order to enable a modular structure to be produced inside the exploitation system. A procedure call is carried out by instructions and an entity recognized by the hardware, called a stack (FIG. 7A).

A stack is a mechanism which accepts, puts into store and enables the extraction of data on the basis of last-in-first-out. The stacks reside in special segments called stack segments. A stack segment consists of a certain number of contiguous portions called stack elements 702 (FIGS. 7A and 7B) which are assigned dynamically to each procedure. The first stack element is loaded at the top of the segment and the next elements are loaded after it. The last stack element loaded is considered as the top of the stack. The register T 702 references the top of the stack for the process in course of activity. A virtual register T exists in the block PCB of all the other processes contained in the system.

A stack element 701 represented in FIG. 7B is composed of 3 zones: A working zone 702 serving for storage of the variables, a memorization zone 703 serving to safeguard the contents of the registers and a communication zone 704 serving for the transmission of the parameters between the procedures. Before a procedure call the user must specify those of the registers which he requires to safeguard and he must load into the communication zone the parameters to be transmitted to the procedure being called. When a call is carried out, the hardware safeguards the contents of the instruction counter IC and of the specified base registers in order to facilitate a return from the procedure called.

Every procedure call creates a stack element inside a stack segment 701 and the subsequent overlapping calls create supplementary stack elements. Each output from one of these called procedures causes cancelling of one stack element. Thus a historical record is kept of the calls, which facilitates an orderly return.

In order to ensure protection between the procedure being executed in the several rings, different stack segments are employed. There is a stack segment corresponding with each protection ring, per process. A block PCB contains three stack base words which designate the start of the stack segment for the rings 0, 1 and 2 associated with the process. The stack segment of ring 3 can never be entered from a call from the inside;

consequently its stack starting address is not required in the block PCB.

IV. MANAGEMENT AND SYNCHRONIZATION OF THE PROCESSES

The system described here ensures operations in multiprocessing which are commanded by an exploitation system employing a combination of software, hardware and firmware. The software creates and cancels the processes inside the system, while the hardware and the firmware ensure transmission of the processes in multiplex to the central unit. In addition, a combination of software, hardware and firmware ensures synchronization between processes.

The processes are normally, but not always, started up and stopped at the beginning and end of operations E/S, during the course of processing of connected jobs and at other moments for purposes considered necessary by the exploitation system. Consequently, a communication system is necessary for efficiently starting up and stopping associated processes and transmitting information between processes. The hardware system of the invention includes data structures called semaphores for establishing a communication channel between the processes.

A. STATE OF THE PROCESS

A process can be in one of four possible states at any moment: under way, ready, waiting or suspended. The hardware recognizes these four possible process states and executes various firmware procedures in order to achieve distribution of the processes and changes of state and in order to maintain the data structures on the basis of a state of the process. The block PCB contains a state zone which defines the present state of its associated process.

A process is in the under-way state when it has command of the central unit. This state implies that there is being supplied to the central unit an address space (segments tables) and a starting address. The central unit then executes the instructions contained in the procedures segments of the process. The word from table J of the name of the process (logical address) from block PCB for the process in course of execution is contained in the process-under-way word (PRW) running to the address BAR+56 of the base of the system (FIG. 6).

The ready state is equivalent to the under-way state with this exception, that the process does not have command of the central unit (CPU) because it has not been recognized by the central unit. A process in the ready state is in competition for access to the central unit with the other ready processes and with the process under way.

A process is in the waiting state when it cannot be pursued until a specific event is produced, such as the transmission of a message by a semaphore. A process in waiting is not in competition for access to the central unit; it may be in competition with other processes awaiting the required event.

A suspended process is a process which has been stopped for a certain time by the software and may be resumed later on. The decision to stop and resume the process is external to the process. Thus a suspended process is not active and consequently cannot receive notification of the production of an event and cannot employ the central unit.

A process is suspended under the following conditions:

1. By the execution of an end instruction (because of the fact that it has completed all its functions);
2. By the execution of a "suspension" instruction by the exploitation system;
3. By the production of an exception condition by which the command is transferred to the exploitation system.

B. SWITCHING OF THE PROCESSES

The processes pass from one state to another either voluntarily by the action of the process during the course of its execution or involuntarily by the action of other processes. A firmware of the central unit called the Distributor or dispatcher commands the movement of the process between their states. This distributor employs a series of queues (which will be described later on) for manipulating the processes which are in the ready or waiting states. The suspended processes are commanded by the software.

Figure 8:
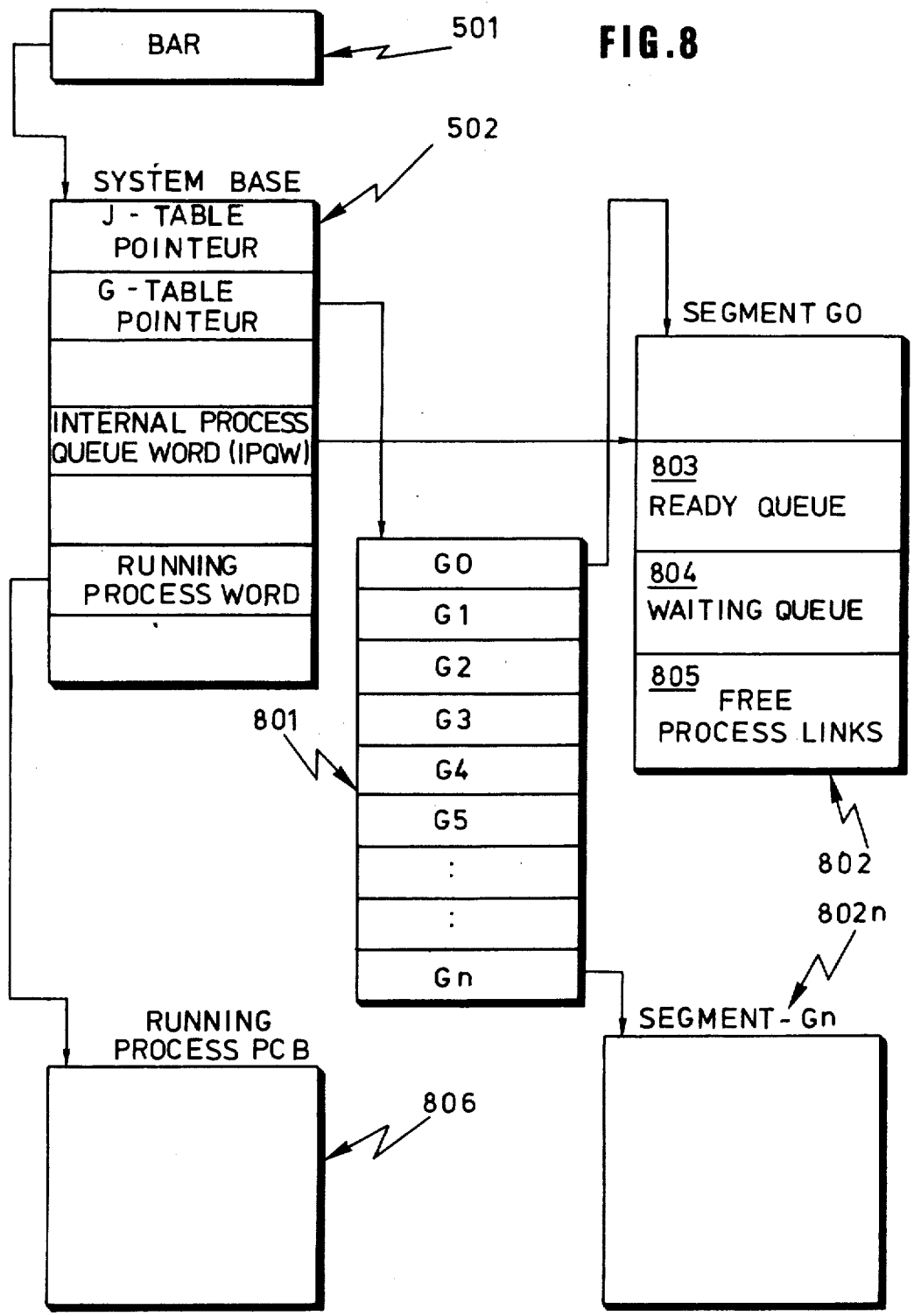
FIG. 8 is a diagrammatic representation of a system employed for addressing the segments G and in particular the processes queue contained in the segment GO.
Figure 9:
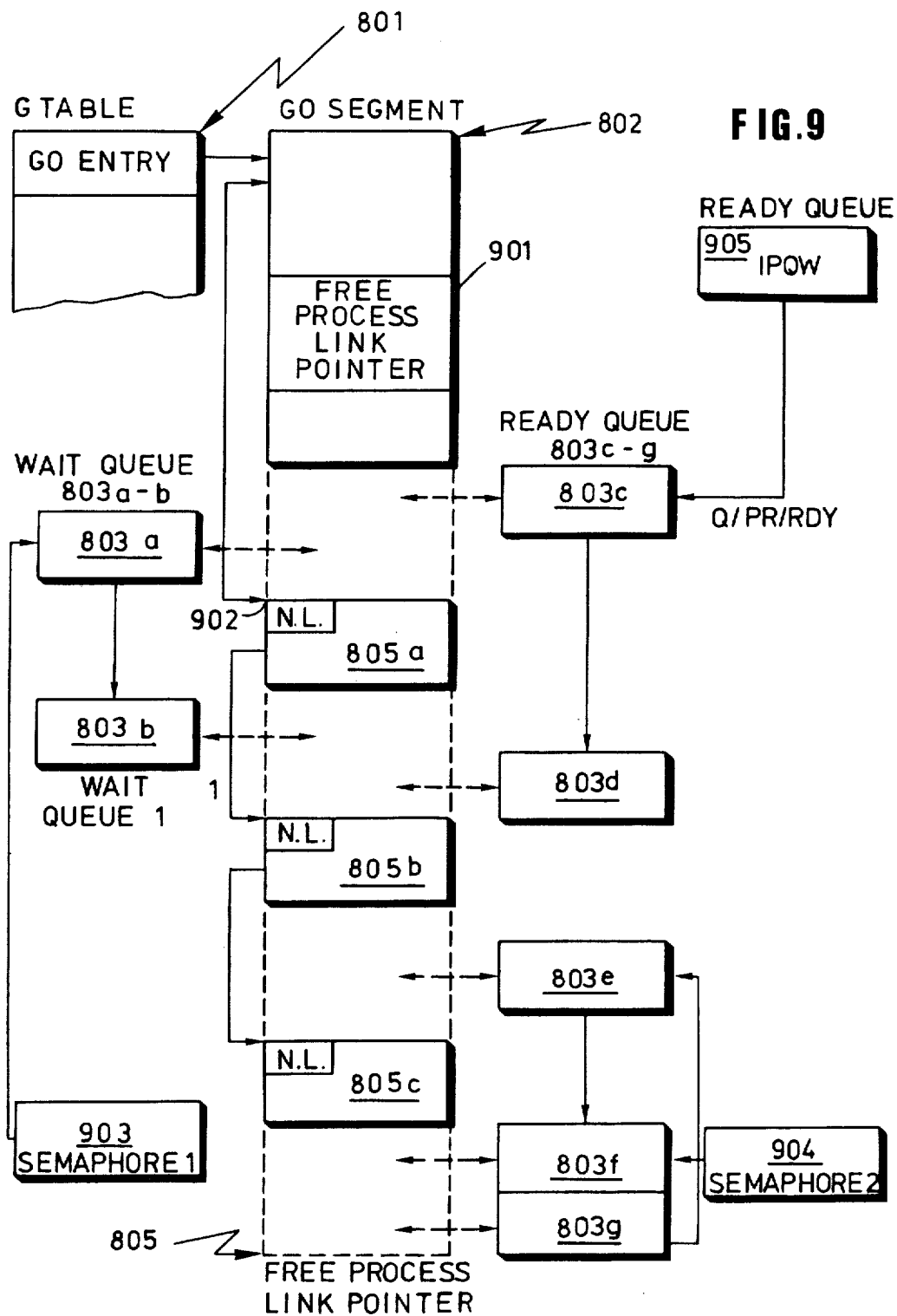
FIG. 9 is an exploded diagrammatic representation of a segment GO showing the processes queue and the process connections.

In FIGS. 8 and 9 to which reference will be made, it can be seen that a waiting process is represented by a block PCB and a special queue entry called a process connection. FIG. 9 represents an exploded view of the contents of the segment GO 802 and contains the process connections 803a–803b and 803c–803d of the active processes and free process connections 805a–805c from suspended processes. Each process connection specifies the name (J, P) of the process and the priority of the process and contains a pointer designating the next process connection in the queue. There are various types of queues, such as the waiting processes queue 803a–803b and the ready processes queue 803c–803g.

A device in the hardware similar to table J, called table G (FIGS. 8 and 9) contains the pointers designating all the general segments (known by the whole of the systems) 802 to 802n. The first element GO of the table G designates the segment 802 which contains the queues of the distributor. One pointer of table G 801 is in the base of the system 502 (FIG. 5). Similarly, in the base of the system is an entry called the word for the queue internal to the processor (Word IPQW) which identifies the top 803 of the queue of ready processes 803c–803g in the segment GO 802.

Thus the distributor can examine all the ready processes by consulting the queue of ready processes 803c–803g. When the process in course of execution changes its state, the distributor takes off the connection of the process at the head of the queue of ready processes and uses its name J, P for gaining access to its block PCB. The process defined by the block PCB then becomes the new process under way.

Inasmuch as a number of processes may be awaiting the same event, a waiting process queue 803a–803b exists for each event. The waiting processes are likewise coupled by means of process connections 805 which lie in the segment GO. A pointer designating the top of a waiting processes queue exists in a semaphone 903 (which will be described later on). There are a certain number of events for which a process may be waiting, consequently there is a certain number of waiting processes queues with each of which is associated a semaphore 903, 904.

The number of ready or waiting processes varies in a dynamic fashion. So the number of process connections necessary to the ready and waiting processes queues likewise varies. This fact introduced a problem of memory management for the distributor. The problem is solved by another queue called the free process connections 805a–805c. This queue connects together all the process connections contained in the segment GO which are not being employed by the ready or waiting processes queues and may be employed for lengthening a particular ready or waiting processes queue. A pointer 901 designating the top 902 of the free process connections queue 805 lies in the vicinity of the start of the segment GO 802.

C. SYNCHRONIZATION OF THE PROCESSES

Synchronization of the processes is necessary in order to coordinate the activities of two processes working on the same task. Synchronization is obtained by employing the semaphores 903–904 which are data structures lying in the address space of the processes in combination. A semaphone is employed for signalling the production of events and for processing message queues. An event in this context is a fact observed by one process which may interest another process. This event may be, for example, the completion of an asynchronous operation or the availability of a resource.

A process employs two semaphore operations for signalling the production of an event. An operation of emission transmits a signal to a semaphore, the other receives a signal proceeding from a semaphore (the emission operation is frequently called an operation V; the reception operation is called an operation P). The emission operation enables a process to transmit data or a signal indicating that data are ready. The semaphore puts the signal in store until another process is ready to receive it. So the emitter process can be pursued freely since it has transmitted the data. The reception operation examines a specified semaphore ahd receives the signal. If a signal is present the receiver process continues its execution. If, however, there is no signal to the semaphore, the receiver process comes into the waiting state. The semaphore then serves as a pointer designating the top of a waiting processes queue. The process remains in the waiting state in the queue in the semaphore until another process transmits a signal to this particular semaphore. So a semaphore can preserve a signal until a process receives it or a semaphore can hold back a process until a signal is transmitted to it.

Messages can likewise be transmitted from process to process. A message has the same quality of presence or absence as a signal plus a piece of supplementary information. One portion of the information is supplied by the hardware and one portion is supplied by the procedure of the process which is transmitting the message. A message bears the process name of the emitter process. Thus a number of processes can transmit information by means of a single semaphore, the information being marked with the name of the emitter.

A messages semaphore can have a queue of messages waiting to be received by processes. Just as for the signals semaphores, the memory space needs increasing and decreasing thus posing a memory management problem. In this case likewise, the problem is solved by means of a free message connections queue. These connections lie in a known location in a segment which can easily be found when it is necessary to provide or absorb message connections.

Because the semaphores and the queues established on them are shared by various processes, the whole of the structure of the semaphores is protected. This is achieved by conventions of the hardware and the software which limit access to any segment containing semaphores. So the semaphores must lie in semaphore describer segments, certain of which may be segments G (if the communications of the system are necessary). However, all the segments G (except the segment GO) are semaphore describer segments.

Every semaphore describer contains a pointer designating a semaphore. The semaphore addresses are developed by means of the semaphore describer which thus provides a supplementary protection to the semaphore. A semaphore segment can be addressed logically by employing a segment number and a displacement relative to the interior of the segment or directly by using the numbers G, D.

STRUCTURES OF THE PROCESS COMMAND BLOCK

In FIG. 4 to which reference will be made, the arrangement has been shown of the process command block (PCB). The process command block 400 is a storage zone in the main memory put at the disposal of a process for safeguarding the state of the central unit. Addressing of a block PCB is carried out as described above with reference to FIG. 5. The block pointer PCB 507 (FIG. 5) designates the process command block PCB at the octet position zero in FIG. 4. It will be observed that when on progresses downwards from the location 0, the memory locations increase in steps of 4 octets while when one progresses upwards from the location 0 in the PCB, they increase in steps of 8 octets. The memory locations in the direction of progression from top to bottom are considered as positive starting from 0 (inside the PCB) while the memory locations located above 0 are considered as progressing in the negative direction. Certain locations located above zero are optional and may be included or not in the process command block (PCB); similarly the locations 148 to 176 are likewise optional. (It will be observed that the numbers placed at the side of the memory locations specify the displacement of the octets from the location reference 0 of the process command block and must not be confused with the reference numbers in general use for identifying elements in a patent drawing). Progressing positively downwards from the octet 0 as far as the octet 16 not inclusive, there are stored in memory four main words of the process PMW0 to PMW3, each process main word PMW having a length of four octets. The process main word PMW0 occupies the octets 0 to 3 and is composed of four portions: a function octet, a priority octet, a state octet and an extended decor octet which are represented in FIGS. 10a to 10d to which reference will be made. In 10a there is shown the details of the process main word PMW0, supplementary details of the function octet 1001 being shown in FIG. 10b. The first bit 1005 is the counting mode bit serving to indicate whether time counting functions are fulfilled or not for the process. When the counting mode bit 1005 is set at the binary value 0, no counting function is fulfilled for the process, while when the counting mode bit is set at binary 1, time counting is executed. The scientific mode bit 1006 when set at zero indicates that the safeguarding of the scientific registers of the machine is not being carried out and that the memorization zone of the scientific registers located at the octets 148 to 176 in FIG. 4 does not exist in the process command block PCB. When the scientific mode bit 1006 is set to binary 1, the optional scientific option exists and is being employed in the process and the memorization zone of the scientific registers is being employed for safeguarding the contents of the scientific registers when that is necessary.

The repeat mode bit 1007 indicates when it is at 1 that a new attempt at the instruction is being automatically carried out, and, when it is at 0, this new attempt is not being carried out.

The details of the priority octet 1002 are shown in FIG. 10c, the first four bits 1008 of the priority octet are employed for establishing the priority level of the process corresponding with this particular process command block PCB. To each process is assigned one of 16 levels of priority which are employed for arranging in order the concurrent processes, that is to say: (a) for selecting the process which is to be passed into the machine out of the ready processes, and (b) for putting the processes into the queues. The priorities descend from 0 to 15 and for a given level of priority, the rule FIFO (first in first out) is applied. The bit 4 is the alarm bit, the bit 5 does not have a functional state and the bits 6 and 7 form the alarm ring number. The employment of the information contained in this octet will be described later on.

Figure 10D:
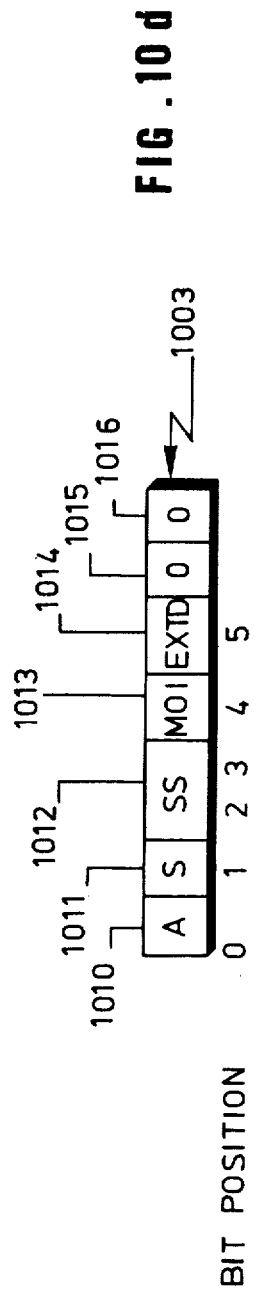

In FIG. 10d to which reference will be made, the details of the state octet 1003 have been represented. A state octet is employed for providing information concerning the process corresponding with the process command block PCB 400. The activity bit 1010 is set to the binary state 1 when the process is made active. The suspension bit 1011 is set to the binary state 1 when the process is suspended. The sub-state field 1012 is a field of 2 bits and it defines the following sub-state of the process:

(a) When it is set to the binary state 01, the process is waiting in the queue of ready processes (Q/PR/RDY);

(c) When it is set to the state 10, the process is waiting on a semaphore in a senaphore queue (Q/PR/S);

(d) When it is set to the binary state 11, the process is in course of execution by the processor.

The semi-operation field MOI 1013 is set to the binary state 1 when an interruption is produced and is processed during the course of execution of an instruction . . . that is to say, before the completion of the process. The extended decor mode bit EXTD 1014 is set to the state 1 when the process functions in an extended decor mode which may be an emulation mode of the machine. The bits 1015 and 1016 are set to zero. The fourth octet of the process main word PMWO contains the extended decor number DEXT and is employed when the system is in an emulation mode.

Figure 10E:
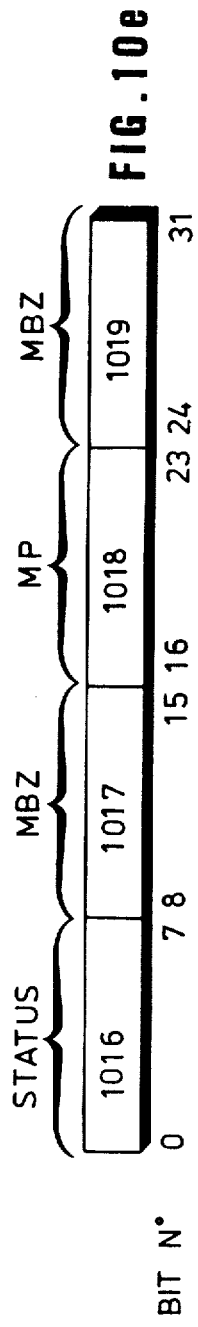

The process main mode PMW1 is stored in the octets 4 to 7 of the process command block PCB. The details of the word PMW1 are represented in FIG. 10e. The state octet 1016 is the first octet of the word PMW1 and puts in memory the contents of the state register. The multiprocessor octet MP 1018 is significant of an architecture with multiple processors; otherwise this field is equal to zero. The second and fourth octets of the process main word PMW1 are respectively the fields MBZ 1017 and 1019 which must be zero for normal operation.

Figure 10F:
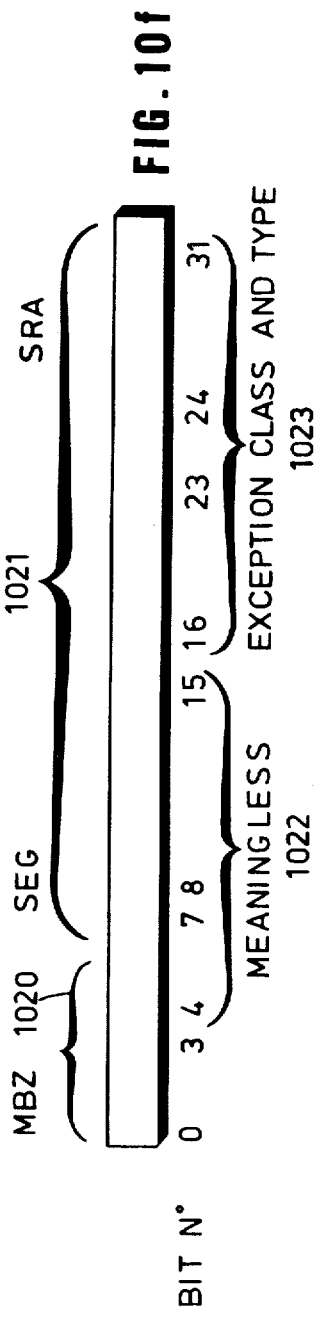

The process main word PMW2 occupies the octets 8 to 11 of the process command block and is represented in greater detail in FIG. 10f. In FIG. 10f, the field comprising the bits 4 to 31 contain the local name SEG, SRA 1021 of the semaphore to which the block PCB is coupled when the process is either in the waiting state or in the suspended state. The exception class and type field 1023 contains the class and type of the exception of interruption species which causes the process to come into the suspended state after an exception. The field 1022 of the bits 4 to 15 is unused when the process is in a state different from those mentioned above.

The process main word PMW3 occupies the octets 12 to 15 of the block PCB 400 and designates a decor extension table. In FIG. 10g to which reference will be made, the details of the word PMW3 have been shown, the field DETSZ (size of the table of the extended decor) 1024 defines the numbers of entries of the table, and, if this field is equal to zero, no decor extension is allowed the process. The field DETA (absolute address of the extended decor table) 1026 is the absolute address of the extended decor table in units of 16 octets and is significant only if the field DETSZ is not nil. The extended decor table is formed by the table entries DETSZ. Each entry has the length of one octet. The DEXt-th entry of the table defines the capacity of the process to operate in the extended decor mode DEXT. When the DEXT-th octet is 0, the extended decor number DEXT is not granted, while when the DEXT-th octet is 1, the extended decor number is granted. Values of the number DEXT other than 0 and 1 are incorrect (cf. FIG. 10a number DEXT 1004).

The octets 16 to 23 of the block PCB 400 contain two addresses space words respectively called ASW0 and ASW1, and each word ASW contains a pointer designating a segments tables words table. The words ASW0 and ASW1 are both of the same format represented in FIG. 10h. The size of the segments tables words table is defined by the number of segments tables words contained in a table and comprises typically 6 words for the word ASW0 and eight for the word ASW1. The field STWSZ 1026 indicates the size of the segments tables words table. The segments tables words table field STWA 1027 contains the absolute address STWA of the table in units of 16 octets . . . that is to say, the absolute address of the table is equal to 16 times the value STWA in octets.

The octets 24 to 27 of the block PCB contain an exception word EXW represented in FIG. 10i in greater detail. The exception word contains a pointer (SEG, SRA) 1028 designating an exceptions classes table which defines the action which must be taken following a process exception depending upon its class as put in memory in the process main word PMW2 (cf. FIG. 10f). The field MBZ 1028 of the word EXW must be zero.

The stack word SKW which occupies the octets 28 to 31 of the block PCB contains the value of the top of the register T of the stack of the process when the process is not in course of execution and is represented in greater detail in FIG. 10j. In FIG. 10j, the bits 0 and 1 define the field TAG 1030. The field TAG 1030 indicates the describer type by its contents and must be zero for the stack word SKW. The bits 2 and 3 of the word SKW contain the field RING 1031 which contains the ring number associated with the segmented address of the stack for purposes of protection, and, in this case, they must be zero. The bits 4 to 31 contain the segment number SEG and the relative address in the segment SRA and constitute a field which identifies the segment described in a segments table and the relative address SRA inside the segment. The stack word SKW is brought to light every time the process leaves the "under way" or running state. It is employed for restoring the contents of the register T every time that the process passes into execution. In the latter case, the fields TAG 1030 and RING 1031 are checked in order to check that they are zeros; otherwise a block-PCB-incorrect exception is produced.

The octets 32 to 35 of the block PCB 400 contain the word contained in the instruction counter ICW which may likewise be called ICC. In FIG. 10k to which reference will be made, there are shown the details of the word of the instruction counter ICW in which the field TAG 1033 must contain the binary value 00 (that is to say, values other than zero are incorrect in the instructions counter). The running rings field RUNNING RING 1034 which occupies the bits positions 2 and 3 define the running number of the process which must be employed by determination of the rights of access to the main memory. The bits 4 to 31 contain the segment number and the relative address in the segment (SEG, SRA 1035) which define the address of the next instruction to be executed.

The field MBZ of the octets 36 to 39 must be zero.

(It will be observed that the field MBZ always designates a field which must be at zero). The word MBZ is checked every time the block PCB is called from the name J, P. If it is not equal to zero, a PCB-incorrect exception is produced.

The stack base words are provided in the block PCB 400 above the zero address of the block PCB for the purpose of time counting when the counting mode bit of the word PCB is set to the state 1. These words are located from the address PCB-8 to the address PCB-40. Each word contains a time or an interval of time expressed in microseconds in its first 52 bits, the bits 52 to 63 being filled with zeros. The double word of the partial execution time RTO (the first 8 negative octets above zero in the block PCB) contains the length of time which will actually be consumed by the processor for the count of the process before a time-expired exception is produced. The word RTO is brought to light in the following fashion: Every time the process leaves the state under way, the value of the time counter of the process is loaded from the word RTO.

The total execution counting double word RUA occupying the octets 9–16 is a time counter which specifies the total period of the time of the processor during which a process has been in the under-way state. The time counted is the time actually consumed by the processor exclusively for the count of the process. The word RUA is brought to light in the following manner:

Every time the process leaves the under-way state, the value of the process time counter PT is read. The difference between the contents of the word RTO and that of the counter RT is added to the word RUA (the value PT is added in succession to the word RTO). It will be observed that the time during which the process is suspended is not calculated. The words RTO and RUA are brought to light even if the counting mode bit is set to 0. However, the words CET, RTA and WTA (which will be described below) are provided in the process command block only if the counting mode bit of the process main word PMW0 is set to the state 1. They are brought to light only in this case.

The waiting time counting word WTA at the octets 17 to 24 is a real time counter which specifies the total real time period during which the process has been in the waiting state. The word WTA is brought to light in the following manner:

Every time the process leaves the waiting state, the time by the clock giving the time of day (not shown) TOD is read and the value of the time of day TOD less the value of the word CET is added to the word WTA.

The ready time counting word RTA which occupies the octets 25 to 32 is a double word which is a real time counter which specifies the total period of real time during which the process has been in the ready state. The word RTA is brought to light in the following manner: Every time the process leaves the ready state the time of day TOD is read and the contents TOD less the contents of the word CET is added to the word RTA.

The current starting hour double word CET which occupies the octets 33 to 40 contains the time of day at which the process has come into one of the following states: ready, waiting, under way, suspended.

STRUCTURES OF THE BASE OF THE SYSTEM

In FIG. 6 to which reference will be made, the configuration of the base of the system 600 has been shown. The base of the system lies in the main memory, is developed by the firmware and is accessible by way of the boundary address register (BAR) which can be read, but not modified. The boundary address register is located underneath a zone of the main memory reserved to the hardware of the base of the system 600. In FIG. 6 to which reference will now be made, the base of the system 600 contains a certain number of attributes of the system among which is a job stage number and a process group number (J, P) for the process in course of execution. From the logical name J, P of the process, the absolute address of the corresponding process command block PCB is obtained. The size and the address of the table J are defined by the contents of the table J word (JTW). This word is located at the address defined by the register BAR. The format of the word JTW is represented in FIG. 11a. The size JTSZ 1101 of the table J 1204 (FIG. 12) defines the number of entries or elements of the table J 1204 which can contain up to 256 entries. The field JTSZ 1101 is a positive whole number of 8 bits or an exception "outside table J" is produced if the number J is greater than the value JTSZ. The absolute address of the table J 1204 is obtained by multiplying by 16 the table J pointer 1102. The table J 1204 contains the table J entries format of which is represented in a more detailed fashion in FIG. 11b. Each entry of the table J defines the absolute address of a table P1205 which is obtained by multiplying by 16 the table P pointer 1104. The size (PTSZ) 1103 of a table P defines the number of entries of the table P. The field PTSZ is a positive number of 8 bits which may typically lie between 0 and 255 for indicating the number of entries of the table P. An exception "outside table P" is produced if the number P is greater than PTSZ. Every entry of the table P 1205 defines the absolute address of a process command block (PCB) 1206 which is obtained by multiplying by 16 the block PCB pointer 1107. A presence indicator P 1106 indicates the absence of a block PCB 1206 when it is in the binary state 0 and indicates the presence of the block PCB when it is set to the binary state 1. (When the presence indicator P 1105 is found in the state 0 a table P entry vacant exception is produced). The bits 1 to 7 of the table P (FIG. 11) indicator 1106 must be 0 (MBZ), otherwise a table-P-entry-incorrect exception is produced.

At the address BAR+4 of the base of the system 600 there is the size octet of the table G word (GTW) represented in greater detail in FIG. 11d. The size of a segments table G 1212 (FIG. 12) is defined by the contents of a table G word (GTW). The size (FTSZ) 1108 of the table G 1212 defines the entry number of the table G which may typically reach 256 entries. The field GTSZ is a positive whole number of 8 bits. An "outside table G" exception is produced if the number G is larger than the size GTSZ. The absolute address of a table G 1212 is obtained by multiplying by 16 the table G pointer 1109. The format of the segments entry G has a length of two words (8 octets) and is called a segment G describer. The segment G describer format is represented in detail in FIGS. 11e and 11f. All the segments G describers are direct and consequently the "indirect" bit I, 1111, must be 0, otherwise there is produced a segment-describer-incorrect exception. The presence indicator 1110 is a field of one bit which when it is set to the binary state 1 indicates that a segment is defined in the main memory for the segment number with which the describer corresponds, while if it is reset to zero, no segment is defined, and a reference to the segment describer causes a segment-lacking exception. The availability bit A 1112 is a field of one bit which indicates whether the segment is available or not; it is checked only if this segment is defined (that is to say, if P is equal to binary 1), otherwise it is ignored. The utilization indicator, field U 1112, indicates whether access has or has not been gained to the segment. If the bit U is set to the binary value 0 access has not been gained to the segment while if the bit U is set to the binary value 1 access has been gained to the segment. The writing indicator bit W 1114 indicates whether a writing operation has been carried out in the segment. If this bit is set to the binary state 0, no writing has been carried out in the segment, while if the bit W is in the state 1, a writing operation has been carried out in the segment. The switching indicator GS 1115 of a segment G describer must be set to the binary value 01, otherwise there is produced a segment-describer-incorrect exception. The reason for this fact is that a segment G always contains semaphores (although the converse is not necessarily checked; that is to say, not all the semaphores necessarily have to be in a segment G) and the instructions on semaphores demand that the code GS be at the binary value 01. The absolute address of the base of the segment 1214 is defined in the segment G describer of FIG. 11e by the base field of 24 bits 1116; the contents of this field is multiplied by 16 to obtain the absolute address. The second word of the segment G describer represented in FIG. 11f occupies the binary positions 32 to 63 in the table G 1212. The field RSU 1117 which occupies the bits 32 to 39 is reserved for the use of the software and is generally ignored when employed as a segment G describer as it is in the present case. The field MBZ 1118 must be 0, otherwise a segment-incorrect-exception is produced. Inasmuch as the field MBZ 1118 occupies the bits 40 to 51, it determines the length of the field SIZE 1119 which is the field for a small segment. Consequently all the segments G must be segments of small segment type. The size 1119 of the segment is a positive whole number of 12 bits defining the number of octets of the segment and the size of the segment is interpreted as a multiple of 16. Consequently the size of the segment of a segment G 1214 cannot exceed $2^{16}$ octets (small segments).

Figure 11G:
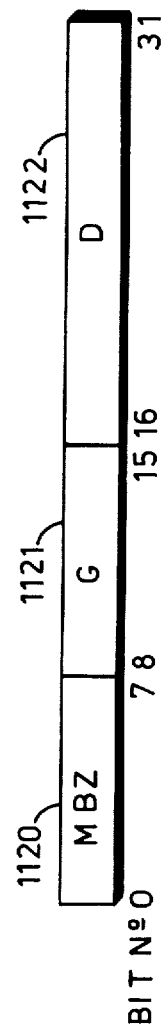

Reference will be made again to the base of the system 600 represented in FIG. 6. There are 9 exception-from-the-system cell words located between the addresses BAR+8 and BAR+44. The format of the exception-from-the-system cell words (EXC) is represented in FIG. 11g. Inasmuch as semaphores are employed for transmitting messages to the assigned processes when an exception from the system is produced, the pointers designating these semaphores are found in 9 memory locations, each location being called an exception-from-the-system cell, one per class of exception from the system. The field MBZ 1120 must be set to the binary value 0, otherwise a check of the system is produced. Each exception cell contains the system name G 1121 D 1122 of the semaphore.

The exception-from-the-system cell located at the address BAR+44 of the base of the system 600 has a format which is similar to that of the exception-from-the-system cell previously described and contains the system name GD of a semaphore which is employed for transmitting messages to certain processes when a channel exception is produced.

Figure 11H:
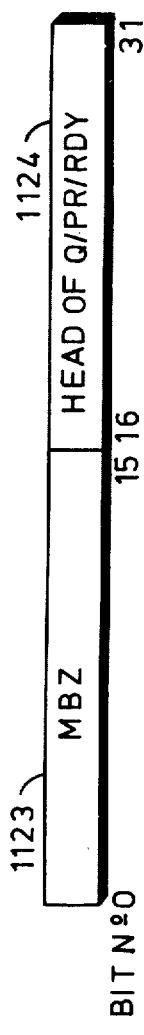

An internal-to-the-processor queue word IPQW is located at the address commencing at BAR+48, and the details of its format are represented in FIG. 11h. The word IPQW designates the top of a ready processes queue (Q.PR.RDY) such as those represented in FIG. 9 and designated by the references 905 and 805. The ready processes queue (Q.PR.RDY) connects all the processes which are in the ready state. It is referenced by the queue head field Q.PR.RDY 1124 (FIG. 11h) of the word IPQW which indicates the top of the queue of ready processes. The queue head field Q.PR.RDY 1124 contains a whole number of 16 bits which is the displacement with respect to the base of the segment G No. 0, called the segment G0, of the first octet of the queue Q.PR.RDY. If this field Q.PR.RDY is zero, the queue of ready processes is considered as being empty. The field MBZ 1123 must be equal to zero, if it is otherwise a check of the system is produced.

Figure 11I:
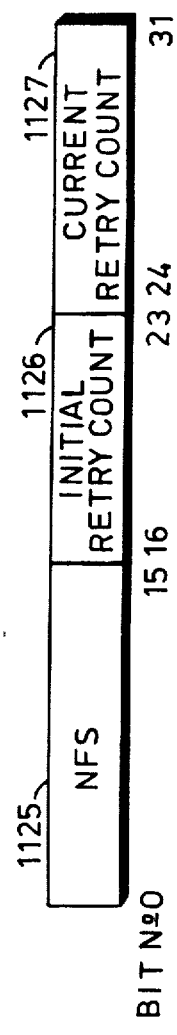

At the address BAR+52 of the base of the system 600 there have been represented the storage positions for the initial counting of retries and for the running counting of retries, of which the format is represented in detail in FIG. 11i. The field NFS 1125 is a non-operational storage field and is not employed by the base of the system. The retries initial counting field 1126 and the retries running counting field are employed for determining the number of times an automatic instruction retry is executed before a machine error is produced in order to create a machine-failure exception condition. They are loaded with the same number by a retries counting restoration instruction (not here represented).

Figure 11J:
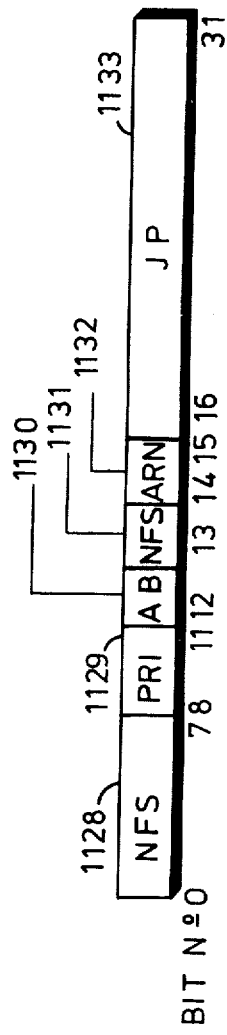

The process-under-way word (RPW) represented in FIG. 11j is put into memory at the address BAR+56 of the base of the system 600 and is employed for keeping in memory the name of the process under way with its priority in the case of an architecture comprising a single processor. The fields NFS 1128 and 1131 respectively are non-operational memory fields and may be employed for any purposes by any system means but they are in general not used by the base of the system. The level of priority of a process under way is stored in the field PRI 1129. An asynchronous trap bit or alarm bit is put into memory in the field AB 1130 while an asynchronous trap ring is put into memory in the field ARN 1132. The logical name J, P of the process under way in the case of an architecture with a single processor is put into memory in the field J, P 1133.

Figure 11K:
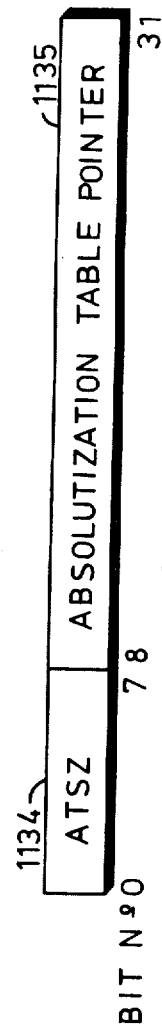
Figure 11L:
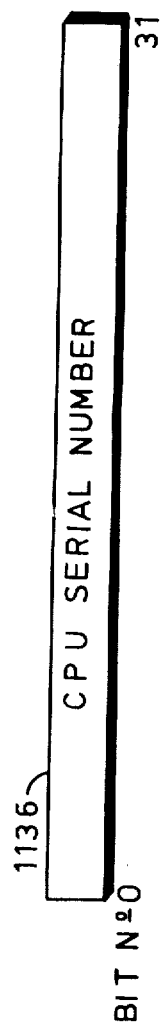

An absolutization table pointer word represented in FIG. 11k is located at the address BAR+60 of the base of the system and is employed during initial loading of the system in order to initialize the absolute addresses in the program of initial loading of the system (ISL) by adding the contents of the register BAR to all the absolute addresses of the program ISL. The absolutization pointer 1135 defines the location of an absolutization table (not show). The size of the absolutization table is indicated by the field ATSZ 1134. The series number word of the processor represented in FIG. 111 is a word of four octets located at the address BAR+64 and contains the series number of the processor in the processor series number field 1136.

Figure 11M:
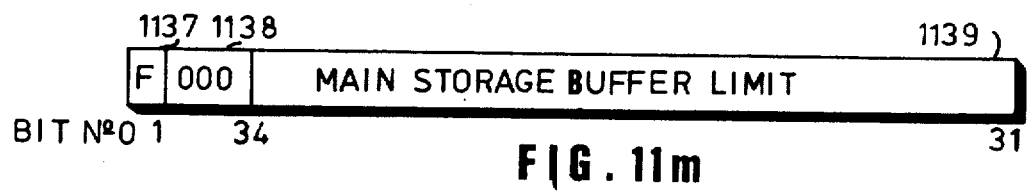

An upper boundary word of the main memory represented in FIG. 11m is located at the address BAR+68 and indicates in the field 1139 the upper boundary of the main memory by giving the absolute address of the last word available in the main memory.

Figure 11N:
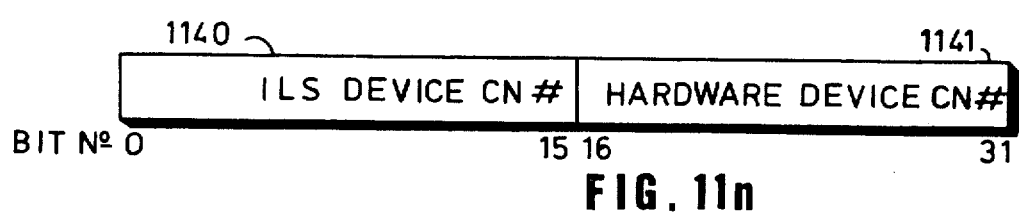
Figure 11O:
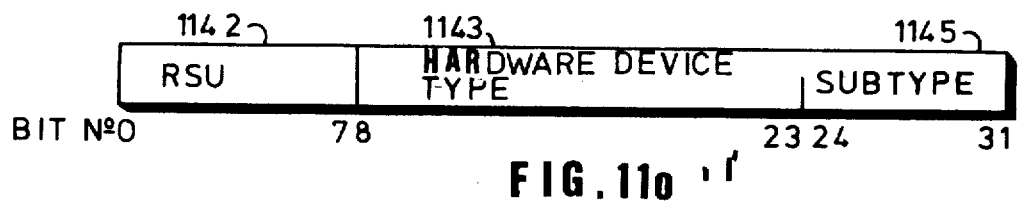
Figure 11P:
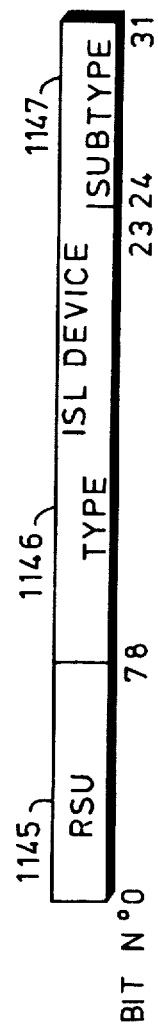
Figure 11Q:
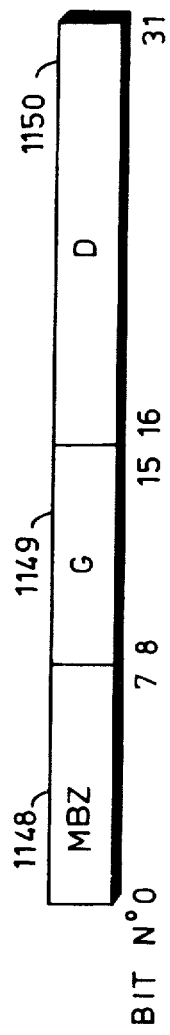

At the address BAR+72 there is a word, represented in FIG. 11n, for indicating the channel number (CN) of the initial loading unit of the system ISL (field 1140) and the channel number (CN) of the hardware device (field 1141).

The type and the sub-type of a device employed in the computer system are represented in a hardware device type word (FIG. 11o) respectively by the fields 1143 and 1144, the field RSU 1142 of this word being reserved for the software. This word is in the base of the system of the address BAR+76. A similar word having a similar type format represented in FIG. 11p contains the type and the sub-type of the device employed for the initial loading. This word is at the address BAR+80.

When the "retry" button of a computer is pressed, a simulated operation V is executed over a semaphore, and the "ready" state is entered. A pointer indicating this semaphore is at the address BAR+84 of the base of the system 600 and is called the retry cell word. This word has the format represented in FIG. 11q. The format is similar to that of the exception-from-the-system cell word described above and contains the system name G, D of a semaphore respectively in the field G 1149 and the field D 1150. The field MBZ 1148 must have the value 0.

Figure 11R:

In the case in which there are a number of processors connected to the computer system, a word is provided in the base of the system at the address BAR+88 for the multiprocessor extension; the details of this word are represented in FIG. 11r.

EXAMPLES OF USE OF THE BASE OF THE SYSTEM AND OF THE PROCESS COMMAND BLOCK

Figure 12:
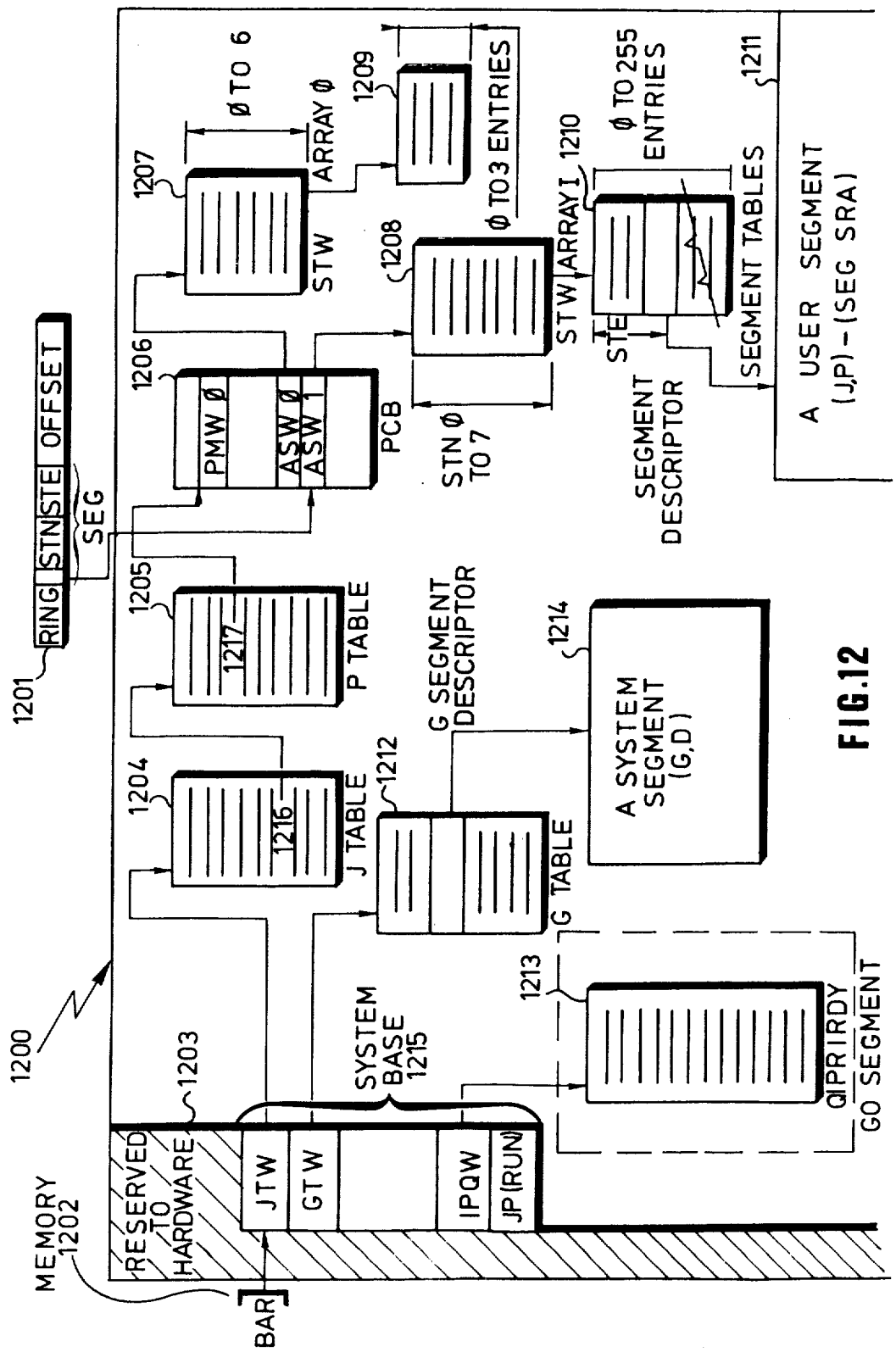
FIG. 12 is a diagrammatic representation of the means employed for addressing user and system segments by employing the system base structures and process command blocks (PCB)
Figure 14D:
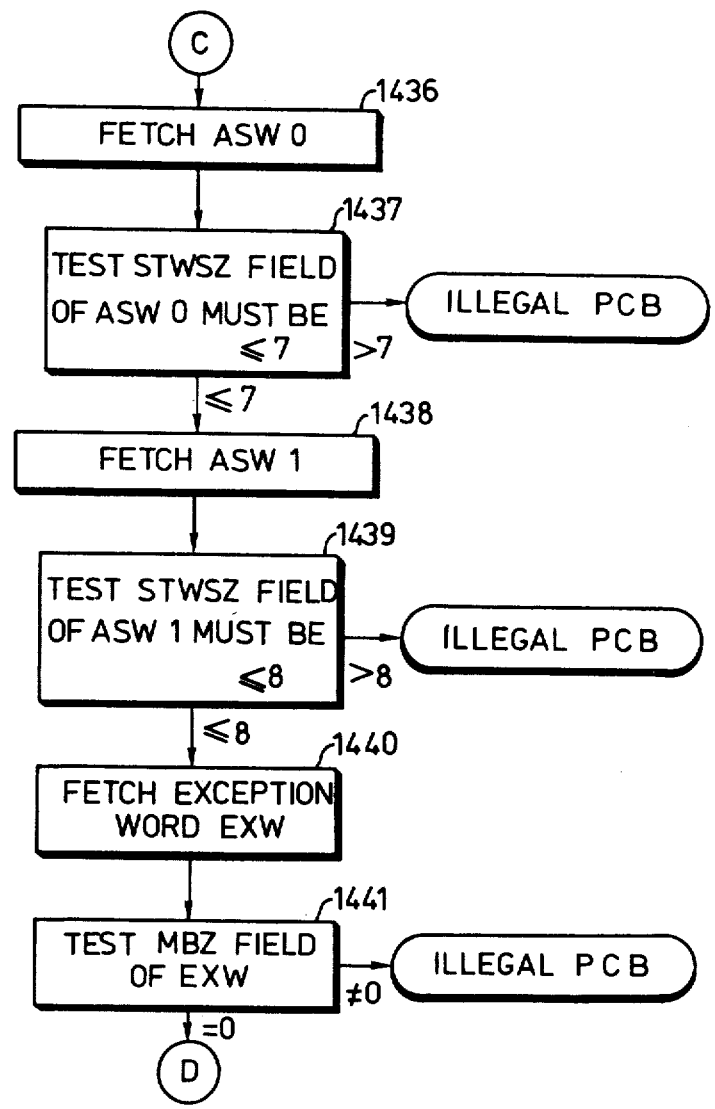
Figure 14E:
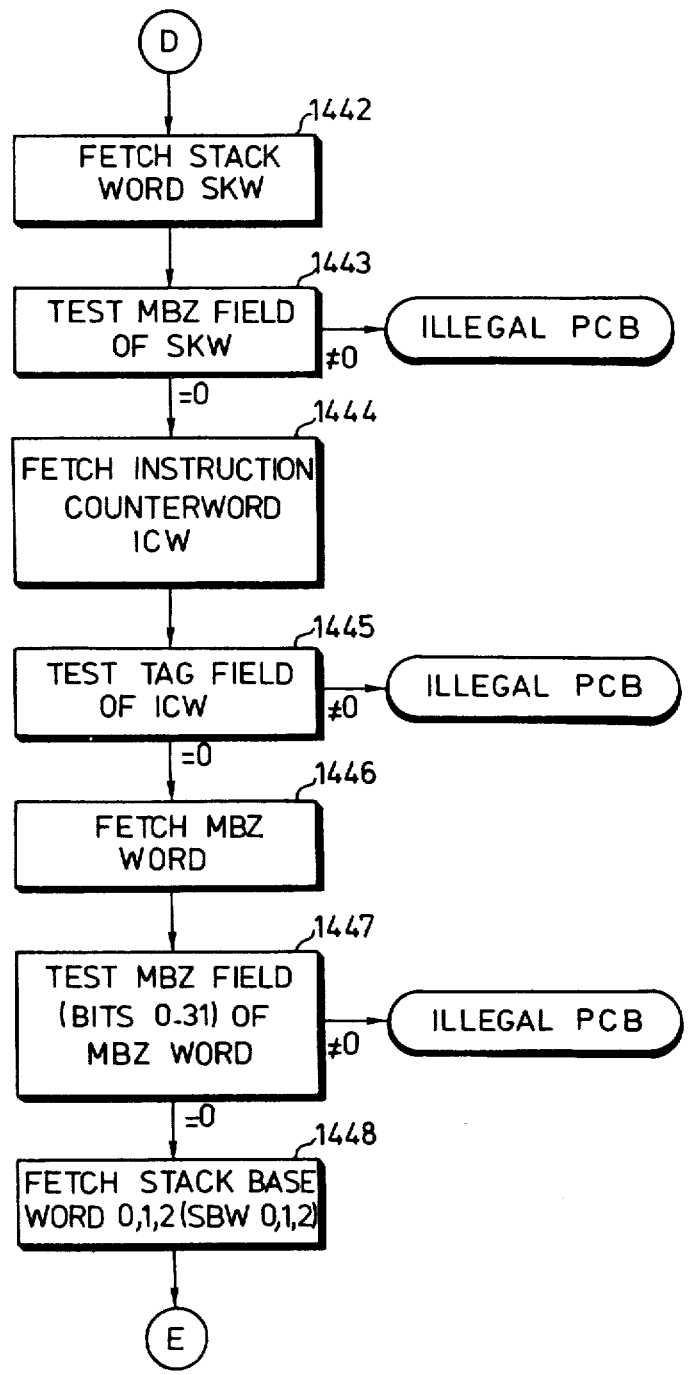
Figure 14F:
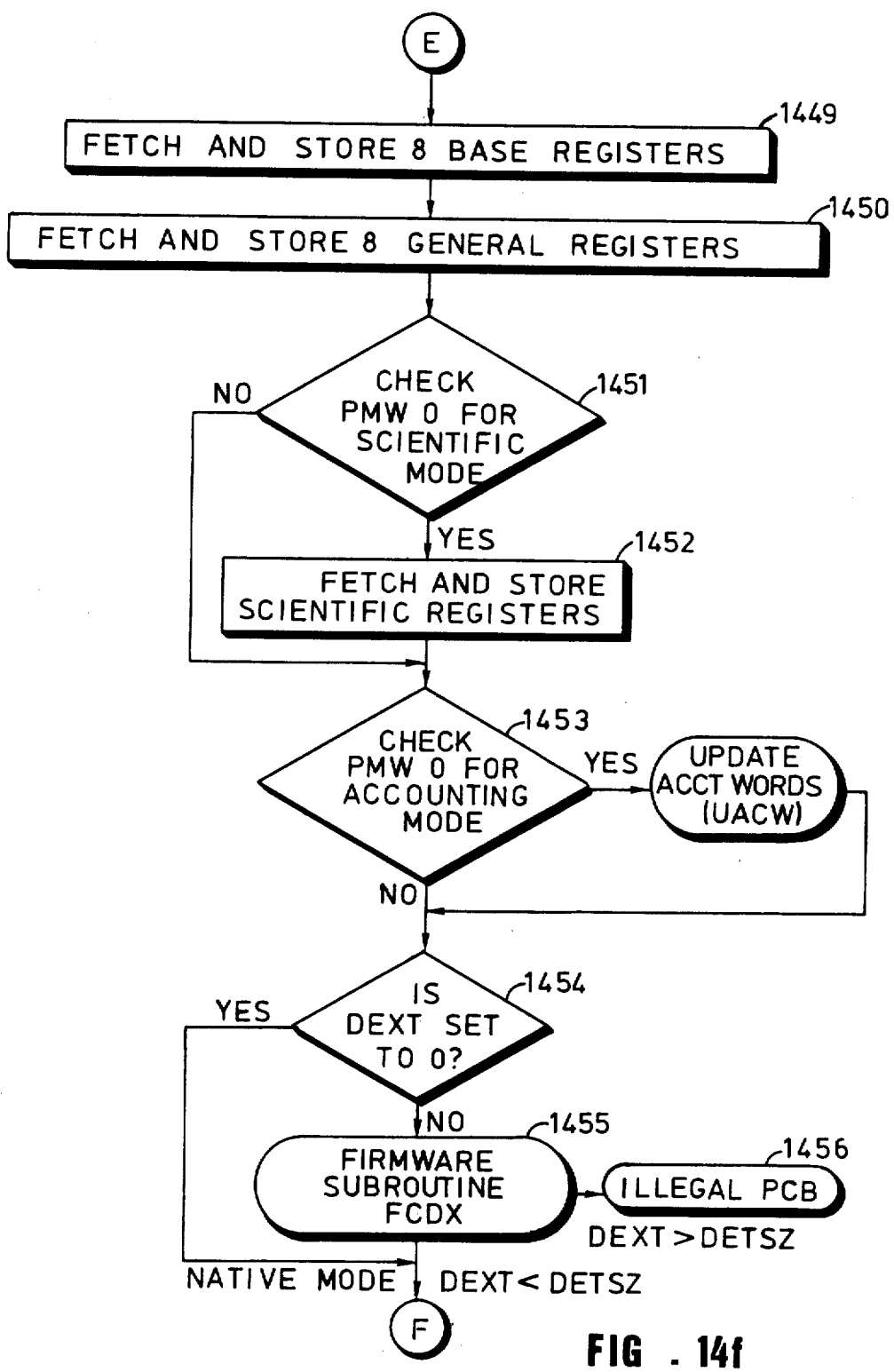
Figure 14G:
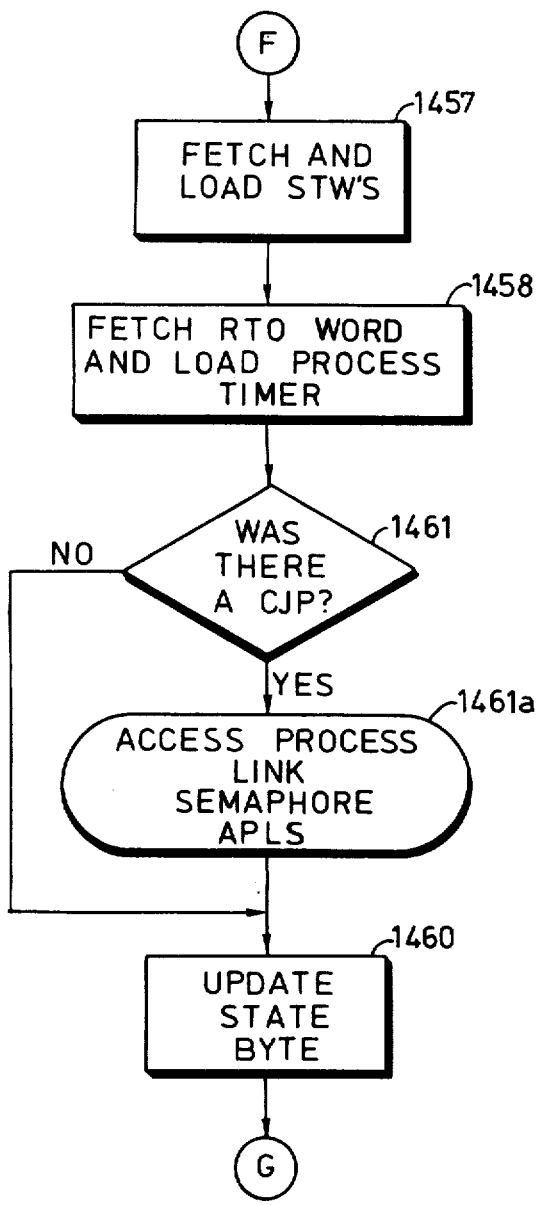
Figure 14H:
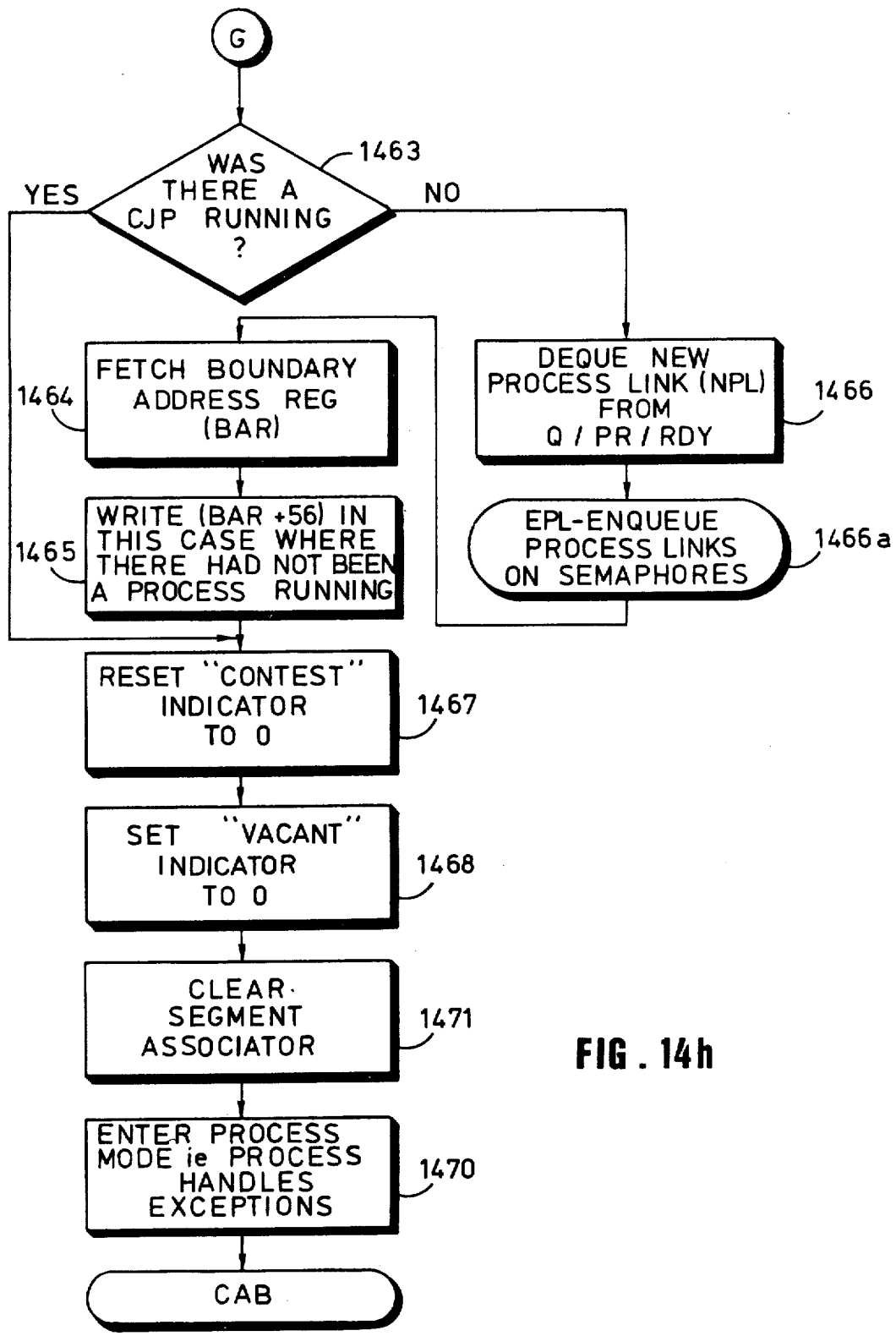
Figure 14I:
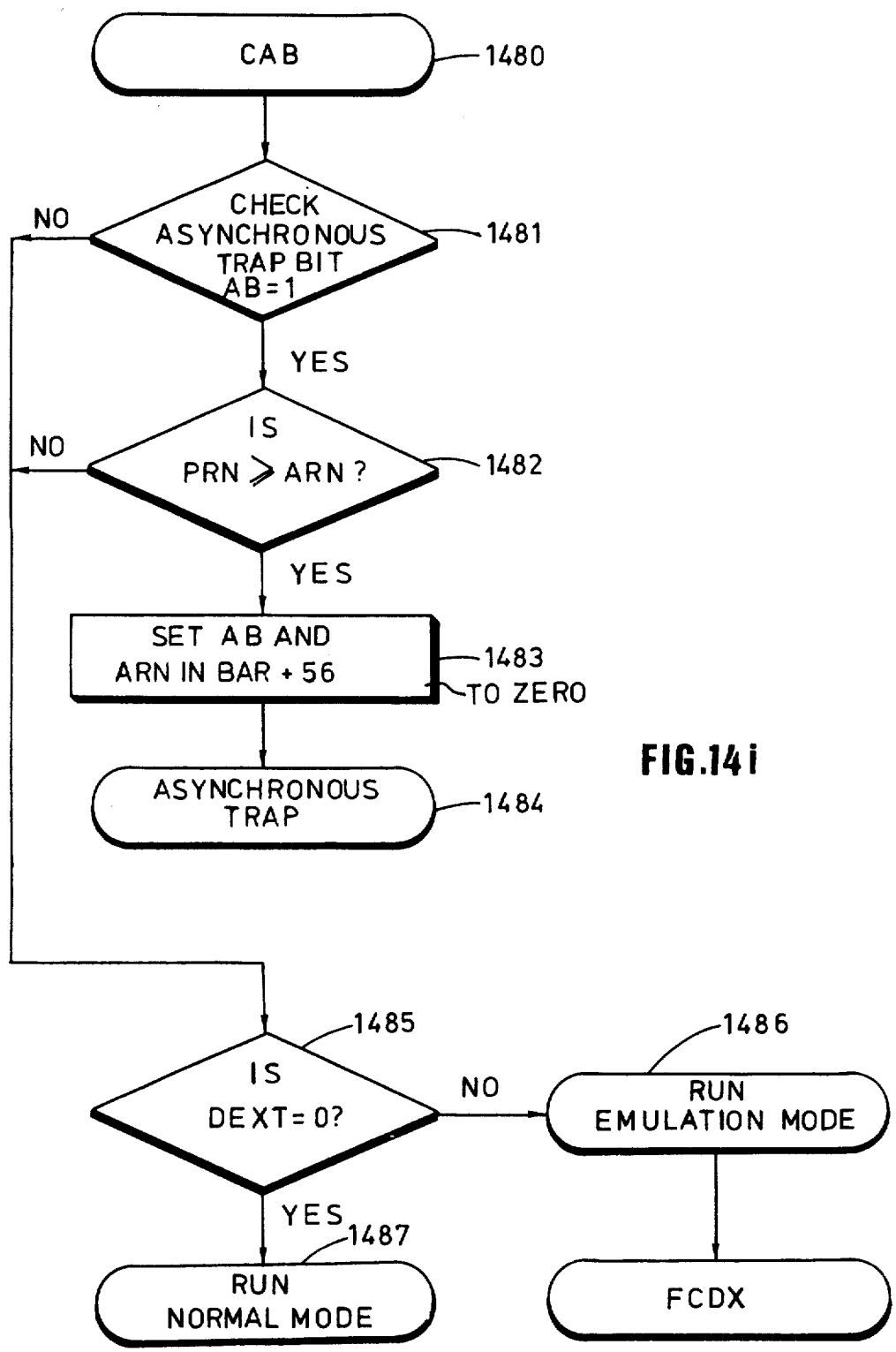

In FIG. 12 to which reference will be made, an example is shown of the way in which the base of the system may be used in combination with the process command block PCB in order to address and gain access to a user segment, a segment of the system or a ready processes queue segment (Q/PR/RDY). The main memory 1200 includes a portion 1203 the use of which is reserved for the hardware. A boundary address register BAR 1202 separates the base of the system 1215 from the portion of the memory 1203 reserved for the hardware. The boundary address register BAR 1202 is used for addressing elements of the base of the system by adding the contents of the register BAR to the displacement in units of 4 octets, of the required element from the base of the system. This address then indicates the first octet of the required element of the base of the system; in FIG. 12, the register BAR 1202 designates the table J word (JTW). The table J words as previously indicated comprises a pointer which designates a table J 1204. By indexing the pointer with the number J shown in FIG. 5 a table J entry 1216 is obtained. In the table J entry is a table P pointer which indicates the absolute address of the table P 1205. By indexing this address with the number P (cf. FIG. 5) in the table P 1205, the absolute address of the process command block 1206 is obtained. As previously described, there are in the process command block PCB 1206 two address space words ASW0 and ASW1. The lefthand bits of the table number field of the segments STN of the base register 1201 are employed for gaining access to one of these two address space words. In the example illustrated, the word ASW1 includes a segment tables words table pointer STWA which designates the segments tables words table STWA 1208. In combination with the segments table number STN of the base register 1201, one of the eight segments table words has gained access into the table STWA 1208 which designates one of the eight segments tables 1210; the segments table entry STE of the base register 1201 is then used for selecting one of the 256 entries of the segments table 1210 in which there is a segment describer. The segment describer is then used for gaining access to a user segment 1211. (For further details reference will be made to the Pat. application No. 73 17765 of May 16, 1973 having as its title "Device for development and calculation of address in a segmented memory").

In order to gain access to a segment of the system 1214 which is used for storing the semaphores, a table G word is used in the base of the system 1215. The address of the table G word is obtained by adding the displacement of the table G word in the base of the system to the boundary address register BAR 1202 (cf. FIG. 6). The table G word GTW includes a table G pointer which designates a table G 1212. By using a number G that the system can obtain and indexing the table G by means of this number access is gained to a segment of the system 1214.

In a similar manner, the base of the system 1215 is used for gaining access to the ready processes queue (Q/PR/RDY) 1213 by looking for an internal-to-the-processor queue word IPQW which designates the segment Q/PR/RDY 1213.

COMMAND UNIT

In FIGS. 13a to 13c to which reference will be made, there are shown the details of the command unit. The command unit, which is of a type shown in U.S. Pat. No. 3,400,371, is described in connection with addition components of CPU 101 which is referred to as CPU 1306. The command unit, although shown separated from the central unit (CPU), is in fact one portion of the central unit and consists of a command store CIA 1302 and cooperating sub-units, namely, the command store loader CSL 1303 and the loading and control unit CLU 1304.

The command store unit CSU 1301 receives microinstructions from the command store loader CSL 1303 by way of the loading and control unit CLU 1304 and the interface adaptor CIA 1302. Under normal conditions of operation, microprograms are loaded from an external source during the course of the initialization of the system and become a permanent command function of the machine. However, the command store unit CSU 1301 has the ability of being reloaded and initialized in a manner which enables a diversity of operational modes of the central unit CPU 1306. The following operational modes of the central unit are available under the command of the command store unit CSU 1301: (a) The natural mode; (b) The emulation mode; (c) The natural and emulation modes simultaneously; (d) The diagnosis mode. This ability is made possible by the fact that the microinstructions lying in the command store CSU are the source of micro-operations employed for commanding the operation of all the other operational units of the central unit CPU, such as the emulation unit 1316, the arithmetical and logical unit ALU 1317, the instruction pointing unit IPU 1318, the address control unit ACU 1319 and the data management unit DMU 1321. There are likewise shown as being contained in the central unit CPU 1306 the general registers 1307, the base registers 1308, the scientific registers 1309, the register T 1310, the state register 1311, the instruction counter IC 1312 and the hardware control mask register 1313, all previously described.

Typically the command store unit CSU 1301 is a programmable read-only store having bipolar integrated circuits of 9k (9216 octets) (PROM) mixed with a store having selective access for writing/reading (RAM). This unit CSU has typically a reading cycle of 150 nanoseconds and a writing cycle of 450 nanoseconds. Each location of the command store puts into store one microinstruction word of 84 bits (which will be described in greater detail later) and each microinstruction word commands one cycle of the central unit CPU. When each command store location of the command store unit CSU 1301 is read, its contents are decoded by micro-operations decoders which provide micro-operations command signals each of these signals causing the execution of a specific operation (which will be described later on in detail) inside the central unit CPU.

By grouping the positions inside each microinstruction word (which will be described in detail later on) command store sequences are obtained which can execute a specific operation or instruction of the central unit. Then each instruction is released by the central unit, certain bits contained in the operation code are employed for determining the sequence of starting of the command store. The control of certain flip-flops (not shown) which are released and restored by operations of decoding of instructions enables the command store to carry out a branching onto a more specific sequence when that is necessary.

The interface adaptor of the command store CIA 1302 communicates with the command store unit 1301, the data management unit DMU 1321, the address control unit ACU 1319 and the arithmetical and logical unit ALU 1317 represented in FIG. 13$_b$. The interface adaptor CIA 1302 comprises logical circuits for modification checking, and control of errors in the addresses from the command store and for the generation of addresses from the hardware. Address generation from the hardware is in general employed for the development of the starting address of error sequences or for the initialization sequence.

The data management unit DMU 1321 constitutes the interface between the central unit 1306 and the main memory and/or the buffer memory represented in FIG. 1. It is the responsibility of the data management unit to recognize which is the unit which contains the information required by other units and to enable transfer of this information to the appropriate registers of the central unit at the appropriate time. The data management unit DMU likewise carries out the masking during the course of partial writing operations.

The pointing unit IPU 1318 communicates with the data management unit DMU 1321, the address control unit ACU 1319, the arithmetical and logical unit ALU 1317 and the command store unit SCU 1301, and it has the responsibility of placing instructions in good time at the disposal of the central unit. The instruction pointing unit IPU 1318 has the next available instruction in its registers before the completion of the instruction under way. In order to obtain this ability, the instruction pointing unit IPU 1318 contains an instructions register of 12 octets (not shown) which normally contains a number of instructions. In addition the unit IPU 1318 under the command of the command store unit SCU 1301 demands information (instructions) of the main memory before the instruction has actually become necessary, thus keeping its instructions register of 12 octets constantly up to date. The instructions are extracted thus previously by means of memory cycles normally unemployed. The instruction pointing unit likewise decodes each instruction and informs the other units of the length and format of the instruction.

The address control unit ACU 1319 communicates with the instruction pointing unit IPU 1318, the arithmetical and logical unit ALU 1377, the data management unit DMU 1321 and the command store unit CSU 1301 by way of the interface adaptor CIA1302. The address control unit ACU 1319 is responsible for all address developments in the central unit. All the operations of the address control unit including transfers to the unit, from the unit and inside the unit are directed by the micro-operations of the command store unit and by the logical circuits of the unit ACU. The normal cycle of the address control unit ACU depends upon the types of address contained in the instruction rather than the type of instruction. Depending upon the types of address, the address control unit ACU can carry out different operations for every address contained in an instruction. The address control unit ACU likewise contains an associative memory 1319$a$ which typically puts into store the base address of the 8 memory segments most recently employed, with their segment numbers. Every time a request for access to the memory is carried out, the segment number is compared with the contents of the associative memory in order to determine whether the base address of the segment has already been developed and put into store. If the base address is contained in the associative memory 1319$a$, this address is employed in the development of the absolute address and a considerable time is saved. If the base address is not contained in the associative memory 1319$a$, it is developed by gaining access to the tables of the main memory. However, after the segment base address has been developed it is stored in the associative memory with the segment number, with a view to future references.

The arithmetical and logical unit ALU 1317 comprises an interface with the address control unit ACU 1319, the instruction pointing unit IPU 1318, the data management unit DMU 1321 and the command store unit SCU 1301. The unit ALU 1317 has as its first function the executing of arithmetical operations and the manipulations of the data required by the central unit.

The operations of the arithmetical and logical unit are completely dependent upon micro-operations command signals proceeding from the command store unit SCU 1301.

A working memory and scratchpad memory LSU 1315 (sometimes likewise called a local memory) cooperates with the arithmetical and logical unit ALU 1317 and the command store CSU 1301. This working memory typically consists of a transistorized memory having 256 locations (32 bits per location) and of selection and reading/writing logical circuits for this memory. The scratchpad memory 1315 is employed for storing the command information from the central unit and information about maintenance facilities. In addition, the scratchpad memory 1315 contains working locations which are mainly used for putting into temporary store partial factors and results during the course of the manipulation of the data. There is likewise associated with the arithmetical and logical unit ALU 1317 an auxiliary memory 1317a consisting typically of 64 bistable flip-flops serving to preserve in memory various states of the computer system.

The central unit likewise includes a synchronization unit 1320 which essentially constitutes two clock systems in one. The first clock system generates the synchronization pulses for the interface adaptor CIA 1302, and the second clock system generates the synchronization pulses for the operations of the operational units inside the central unit.

In FIG. 13c to which reference will be made, there is represented the format of the command store word 1325. The command store word has typically 84 bits and is divided into 6 main zones or "fields":

(a) Sequence type 1326 (3 bits);
(b) Branching and/or micro-operations 1327 (23 bits);
(c) Generation and designation of the constants 1328 (14 bits);
(d) Data towards the bus 1329 (8 bits)
(e) Micro-operations 1330 (32 bits); and
(f) Control 1331 (4 bits).

The field E of 3 bits of the command store word 1325 is employed as the sequence command field. There are typically 7 different types of sequence and 1 type reserved for the present computer system. As indicated in the block 1335 of FIG. 13b, when the field E is e al to the binary value 0, 1 or 2 the branching field A, B, C, D and L of the microinstruction 1325 is employed for generating the next address. The first six bits of the address register KS 1337 are employed in combination with the field B, the test results C, the test results D and the field L to supply the next address of the next microinstruction which is then placed in the address register KS 1337. When the field E is set to the binary value 4 (cf. block 1335, FIG. 13b) the next address selected is extracted from the interruption return register KA 1339. The address preserved in the register KA is that generated by the generation logic of the next address when an interruption of the hardware is produced. When the field E is set to the binary value 5, a branching is employed for releasing a sub-return from a sub-program of the microprogram. When the field is employed, the contents of the return register KR 1346 is employed as the next address of the command store. The return register 1346 is located by the emission of a command by the command store which loads the present address of the command store contained in the register KS 1337, plus 1 from the incrementer 1338 in the register KR 1336. A subprogram capacity with overlapping by a supplementary level is carried out by means of the return branching register KT 1347. Every time the register KR 1346 is loaded, the former contents of the register KR are transferred to the register KT 1347; every time the return of the microprogram is called for, the contents of the register KT are transferred to the register KR. A sub-program capacity with an overlapping at three levels is provided by the register KU 1348 and a sub-program capacity with overlapping at four levels is offered by the return branching register KV 1349. When the field E of the command store word is set to the binary value 6, the next word of the present command store, which is addressed is equal to the present address of the register KS 1337 plus 1 added by the incrementer 1338. When the field E is set to the binary value 7, the command store CSU comes into the diagnosis code and the next address is the present address plus 1.

Over and above the sequence command for branching to the next address of the command store as described above and represented in the block 1335, there is a sequence command generated by the hardware represented in the block 1336 of FIG. 13b (Note: the blocks 1335 and 1336 are in practice hardware registers which have been represented thus in order to show the different forms the microinstruction words can take). The branchings generated by the hardware are priority conditions (such as errors, initializations, scanning of the command store, etc ...) which cancel the field D and introduce a fixed address into the address register KS 1337 of the command store. The branching is carried out by bringing an interruption line (not shown) at a high level for one period by the clock and by storing the address which would have been generated under the command of the field E in the interruption return register KA 1339. An address generated by the hardware is then placed in the address register of the command store. Certain interruptions generated by the hardware/firmware have priority when the interruption blocking flipflop (not shown) is set, which prevents supplementary interruptions in their class from being able to be executed until the interruption condition under way has been satisfied. There is a micro-operation of the firmware for commanding the restoration of the interruption blocking flipflop for those of the sequences which are under the command of the firmware. The sequences which are under the command of the hardware automatically generate a restoration of the blocking flipflop at the end of the sequence. The following conditions told in order of priority exist in this category: (a) loading of the command store; (b) scanning of the command store; (c) hardware error; (d) software error. The other hardware conditions do not engage the interruption blocking flipflop but cause the execution of an immediate action when they are generated. The following conditions told in order of priority exist in this category:

(a) initialization;
(b) soft clear;
(c) maintenance panel entry;
(d) maintenance channel entry;
(e) hardware output.

An initialization signal leads the command store CSU 1301 to branch to the binary address 0, to erase the errors restorable by the hardware and to execute an operation of loading the command store followed by the sequence of scanning the command store under the command of the hardware. This signal likewise causes the initialization of the system. A soft clear signal leads the command store CSU 1301 to branch to the binary address 0, to erase the errors restorable by the hardware and to restore the interruption blocking flipflop. A maintenance panel entry signal leads the command store CSU 1301 to branch to the address preestablished in the address switches of the command store on the maintenance panel (not shown).

A maintenance channel entry signal leads the command store CSU 1301 to branch to an address generated by means of the maintenance channel (not shown). The address loaded proceeds from the maintenance bus QMB 1344 which forms part of the maintenance channel and is justified to the right. A hardware output signal causes branching of the command store CSU to the binary address 2. This sequence is employed as a means of maintenance. At the end of the sequence a return is released by emitting a branching of the field E with the field E set to the binary value 4.

A command store loading signal leads the command store to branch to the binary address 0. This signal likewise closes the flipflop (not shown) of the reading cycle of the command store CSU, stops the system clock 1320 and puts the command store CSU in the loading state. In the loading state the command store can be loaded from the command store loader CSL 1303, from the input/output controller IOC 1305, from the main memory 102 or from the maintenance panel 1355. When it is loaded from the loader CSL 1303 automatic scanning is generated at the end of the loading. When it is loaded from any other means, whatever, scanning may be commanded either by generating a micro-operation signal or by engaging the scanning switch on the maintenance panel. A scanning signal from the command store causes branching of the store CSU to the binary address 0. A scanning of the command store is under the command of the hardware during the whole duration of the sequence. During the course of the scanning, the system clock 1320 is stopped, and, consequently, no command or test is executed. At the end of the scanning sequence, the hardware transfers the contents of the interruption return register KA 1339 to the address register KS 1337, the system clock is started up again and the command is restored to the firmware.

An error signal from the hardware causes branching of the command store to the binary address 4. In the normal processing mode an error of the hardware detected in any operational unit of the central unit CPU renders active an error line from the hardware (not shown). The command store sequence generated tests and checks the system conditions in order to determine the action to be taken. In the diagnosis mode the error conditions which can be detected by the hardware are visible to the microdiagnoses. The microdiagnoses command the action to be taken. An error signal from the software on the other hand causes branching of the command store to the binary address 1. This address is the start of the software error report sequence which is under the command of microprograms.

In FIG. 13c to which reference will be made again, the field E 1326 is a field of 3 bits for the branching code as previously described. The branching and/or micro-operations field 1327 is composed of the fields A, B, C, D and L (represented likewise in the block 1335 of FIG. 13b) in which the field A represents the six lefthand bits of the next address, the field B and 4 central bits of the next address of the mask field on a branching to 64 ways, the field C is a test field of 6 bits for one of 64 tests, the field D is another test field of 6 bits for one of the 64 tests and the field L is the least significant bit. The field K 1328 is a field of 14 bits of which six bits are intended for constant fields, 4 bits are intended for a constant field or an orientation field and 4 bits are intended for a constant field or an orientation field and 4 bits constitute an orientation field for a constant. The "data towards bus" field 1329 is composed of the field QA having 4 bits for commanding the information transmitted to the portion QB of the bus QMB 1344. The field F 1330 is a field of 32 bits which is coded for generating micro-operations sub-commands. The field P 1331 is composed of 4 bits reserved to the control.

In operation, the microinstruction words are stored in the table of the command store 1333. During the course of an operational cycle the command store is addressed by the contents of the address register KS 1337. This causes the reading of the contents of the location specified by the address in the reading flipflops group 1357. Portions of the contents of the word which is lying in the reading flipflops are distributed or transferred to storage registers inside each of the operational units of the central unit. Each operational unit includes decoding logical circuits for generating the required sub-commands specified by the command store word under the command of the system clock. In general the decoding is carried out inside each of the operational units of the central unit rather than being carried out centrally in order to reduce to the minimum the decoding time and to reduce the number of cables which would normally be necessary for transmitting the command signals if the decoding were carried out centrally. In addition, the decoding is carried out inside each unit in order to avoid the problems of synchronization proceeding from the differences in transmission lag between the cables. Furthermore, by decoding the sub-commands inside each unit, those of the signals which are representative of certain conditions existing inside the operational unit and are necessary for the generation of certain sub-command signals have not been returned to the adaptor CIA 1302. A typical decoder 1359 is represented in FIG. 13b as receiving various fields of microinstructions words and generating micro-operation signals A, B, C, D . . . Q, R. A decoder of typical micro-operations 1359 receives commands from a microinstruction word. The field of the microinstruction word is decoded and brings to a high level one of a plurality of lines s,t,u . . . y,z. A matrix is formed by having a predetermined command line impedance coupled to the lines s - z at the points $\alpha$, $\beta$, $\gamma$ . . . $\psi$, $\omega$. Typically, then, when the filed of a microinstruction is decoded, one of the lines s - z passes to a high level. Inasmuch as the circles designated on the matrix by the greek letters $\alpha$ to $\omega$ represent the inactive coupling between the two series of lines, any electrical signal being propagated over a horizontal wire is coupled so as to be propagated over a vertical wire A to R when an inductive coupling (circle) is indicated. Each vertical line A - R can then be coupled to form one of the inputs of a gate ET, 1360 to 1365 respectively. Other input signals can be applied to the gates ET 1360 to 1363 and especially a synchronization signal TS proceeding from the central synchronization unit. Consequently, when each signal TS passes to a high level, those of the gates the other inputs of which are at a high level are set open and supply microinstruction signals to predetermined operational units of the central unit. For example, if a command 1341 from the reading flipflops 1357 is decoded and the horizontal line is brought to a high level and the gates ET 1360, 1361, 1362 and 1364, when the synchronization signal TS is applied to these gates, are rendered active in sequence. Consequently the combination according to which the vertical command lines are coupled to the horizontal command line at different points represented by the greek letters α to ω represents a permanent switching matrix for supplying micro-operations signals to the central unit CPU in order to command the operational units inside the central unit by these microinstructions supplied by the command store 1333. Thus a permanent firmware displaying the characteristic of being able to be modified can be incorporated into the machine of this invention simply by specifying the micro-operations sequence which is required as one of the abilities of the computer system.

Under normal conditions, the data are written into the command store table 1333 by way of the writing data register of the central unit likewise called the local register YO 1343. A command flipflop (not shown) defines whether the writing is to be carried out in the upper half or the lower half of the memory table. The data proceeding from the loading and control unit CLU 1304 arrive in the interface adaptor and in the command store unit CIA/CSU by way of the maintenance bus QMB 1344 and are put into intermediate storage in the local storage register YO 1343 before being written into the command store 1333. The local storage register YO 1343 is employed on shared time both as the local writing register and as the local reading register. The multiplexer 1345 can be commanded either by the maintenance panel 1355 or by microdiagnoses and establishes a reading path in output from the registers which are connected to it. A comparison register KP 1350 is ready for non-operational use and is employed essentially for the purposes of maintenance and is employed in combination with the logical Equation KS=KL 1352 and the decoding logic 1351.

FIRMWARE OF THE DISTRIBUTOR FOR THE COMMAND OF THE PROCESSES

The distributor is a firmware/hardware unit the main object of which is to manage the various process queues and to carry out the shunting between the processes and it includes the functions of bringing to light process queues, process command blocks (PCB), the process word under way in the base of the system and registers of a new process. It likewise delivers a message to a process which is actually awaiting such a message over a semaphore (after an operation V, a simulated operation V for the input-output control IOC, for the exceptions manipulator). It likewise puts a message into the queue of a semaphore after an operation P which frees a message connection when a process is waiting on the free connections semaphore in order to deliver its message.

The distributor unit in addition calls for the instructions firmware, in the natural mode after "recall" of a process executed in the natural mode or after a conflict if the running process remains under way and is being executed in the natural mode. It likewise calls for the decor extension firmware for:

(a) a temporary call during the course of the "withdrawal" of a process being executed in the extended decor;

(b) a temporary call during the course of the "recall" of a process being executed in the extended decor;

(c) a definite call at the end of the "recall" of a process being executed in the extended decor;

(d) a definite call after "conflict" if the running process remains under way and is being executed in the extended decor.

In addition the distributor places the system in the no-load loop when there is no process under way.

There are a number of ways of entering or leaving a distributor, which are the following:

1. The initialization procedure SIP supplies an entry at its last stage (cf. French Patent Application No. 73 42704 of the 30th November 1973 having as its title "Hardware/firmware counting mechanism for an information system").

2. The start and suspension ensures an entry into the distributor. The instruction "Start" starts up a process, the instruction "suspension" terminates a process (see French Patent Application No. 73 42674 of the Nov. 30th 1973 having as its title "Process management system for a central processor").

3. The operations P & V ensure an entry into the distributor. The operation P picks up a message proceeding from a semaphore and if there is no message the process is then put in the waiting state (cf. French Patent Application No. 73 42691 of the Nov. 30th 1973 having as its title "Process synchronization by the use of semaphores").

Summarizing, the distributor is the main mechanism which manages the processes and consequently the process command blocks PCB, by deciding which is the process which is to be passed into the machine, and then, by executing the appropriate action, such as the withdrawal of the process in course of execution (namely: to write into the block PCB all the information relative to the process in course of execution contained in the registers of the hardware, the working memory, etc....) and the recall of the new process (to write, by extracting them from the block PCB into the various registers of the hardware, the working memory, etc..- ..all the information necessary to passing the new process through the machine).

The functions fulfilled by the distributor are represented in the programs of FIGS. 14a to 14i. For example, the block 1402 of FIG. 14a₁ represents the function fulfilled by the distributor according to which a microprogram word is supplied by the command store unit 1301 and after its decoding by the decoder 1359 this word commands the interested portions of the central unit by means of an appropriate series of micro-operations signals 1360, 1361 etc....to extract the word IPQW (internal-to-the-processor queue word) and to transfer it to the working memory or the scratchpad memory 1315. Simultaneously the distributor extracts at stage 1404 the segment describer G0 (cf. FIG. 12) from the table of the segments describers designated by the table word GTW in the base of the system.

The bits 16–31 of the word IPQW contain a positive whole number of 16 bits which is the displacement from the base of the segment G number 0, called segment G0, from the head (first octet) of the queue of ready processes (Q/PR/RDY). If the bits 16–31 of the word IPQW are at 0 as determined at stage 1403, the ready processes queue is considered as empty. If the ready processes queue is empty, that indicates that there is no process at present waiting in the queue Q/PR/RDY and the ready processes queue is empty. The next question which must be decided (decision stage 1405) is to determine whether there is a process in course of execution in the machine or not, by determining whether the indicator FREE is at 1. The indicator FREE is a flipflop located in the auxiliary memory 1317a, it is set when there is no running process CJP in course of execution in the processor. If the indicator FREE is set (that is to say, there is no process in course of execution), and inasmuch as it was previously determined that there is no process in the ready processes queue to use the processor, the machine then sets itself in the state of rest or no load (at the stage 1406). However, if there is a process at present in course of execution in the machine, but there is no process waiting to use the machine, the process in course of execution gains access to its next instruction, at the stage 1407. Returning now to the decision stage 1403 of the program of FIG. 14$a_1$, if the pointer zone of the word IPQW (namely the bits 16 to 31) contains a positive whole number, the ready processes queue head designated by the word IPQW in the segment GO is extracted and loaded into the working memory (scratchpad memory) (N.B. In order to avoid repetitions and for greater clarity in the description, the intermediate operations executed by the distributor in combination with the command store unit and the central unit have been omitted below; however, it is obvious that such intermediate operations such as those previously described by way of example, are typically present). At this point it has been determined that there is a process waiting in the ready processes queue. Before another action can be taken it is necessary to determine whether there is a process at present in course of execution in the central processor; this is determined at the decision stage 1410 of the program and if there is no process in course of execution the process at the head of the ready processes queue is put into execution at the stage 1412. However, if there is a process in course of execution in the central processor the distributor must determine that one of the two which has priority: the process in course of execution or that at the head of the ready process queue. Consequently the priority octet of the running process (CJP) which is located in the process under-way word of the base of the system 600 or in the process main word PMWO of the block PCB 400 is extracted at the stage 1413. A decision is then taken at the stage 1414 in order to determine whether the process in course of execution CJP has a priority lower than that of the new process NJP waiting at the head of the ready processes queue (decision stage 1414). If the process under way, CJP does not have a priority lower than that of the new process NJP, the process CJP preserves the command of the central processor and the conflict indicator is reset to 0 at the stage 1415a. The conflict indicator is always set to zero except when one or a number of new processes have been placed in the ready processes queue since the start of the last instruction executed for the count of the process under way CJP so creating the possibility of a conflict; under these conditions the conflict indicator is set to the binary value 1. Before the running process CJP has the authorization to carry on and execute new instructions a check is, however, carried out in order to determine whether the running process CJP is being executed in an extended decor mode, at the stage 1415. If the process CJP is being executed in the extended decor mode the next instruction is executed in the emulation mode (that is to say, in the extended decor mode (stage 1419a)) and if the process is not being executed in the extended decor mode, the next instruction is executed in the natural mode (stage 1419b). Returning again to the decision stage 1414 if the new process NJP at the head of the ready processes queue has a priority higher than that of the running process CJP (that is to say, its priority number is lower than the priority number of the process CJP) the process at present under way CJP is withdrawn from the machine and the new process NJP is called back into the machine. Consequently a priority sub-program of the firmware PRIQ at the stage 1418 commands the putting into queue of the running process CJP into the ready processes queue according to the order last in first out and the priority number by first of all effecting the withdrawal of the running process CJP in the direction of the withdrawal sub-program RLLO of the firmware (first stage 1419). The withdrawal sub-program program RLLO directs the writing of the information of the process CJP which is stored in the general registers, the base registers, the scientific registers, the register T, the state register and the instruction counter, back into appropriate memorization zones of the process command block PCB and it commands the bringing to light of the total execution counting word RUA. In addition the number of the process main word PMWO of the block PCB 400 is brought to light at the stage 1420.

The new process NJP is then ready to be called. The boundary address register BAR is extracted at the stage 1422 and the process-under-way word RPW is extracted at the address BAR+56 at the stage 1423. The name of the new process NJP is next written into the process-under-way word RPW and inasmuch as the name of the new process NJP was written into the process connection PL of the queue Q/PR/RDY, the name contained in the process connection PL is consequently placed now in the word RPW at the stage 1424. Consequently the new process NJP extracted from the ready processes queue becomes now the process under way CJP and has the right to command the central processor and consequently it is no longer waiting in the queue Q/PR/RDY and must be withdrawn from the queue by the withdrawal of its name out of the process connection PL of the queue Q/PR/RDY at the stage 1425. When this is carried out the ready processes queue Q/PR/RDY is brought to light by the sub-program of the firmware UQLK at the stage 1425a. Consequently the number JP of the process which has just been put out of the machine is placed at the stage 1426 in a process connection in the queue Q/PR/RDY inasmuch as it no longer has the command of the machine and must wait to obtain it. At this point, the transformation consisting in giving the command of the central processor to the new process and in placing the former process in a ready processes queue is completed and because there is a process (the new process under way CJP) which has the command of the central processor the indicator FREE is set to zero at the stage 1427. If on the contrary, no process CJP had the command of the central processor the indicator FREE would be set to the state 1. At this point the assignment of the processor is terminated and a new process has acquired the command of the central processor, while the former process has been placed in a ready processes queue. However, the new process is not yet ready to be executed, because the hardware of the central unit 1306 (FIG. 13a) such as the general registers 1307, the base registers 1308, the scientific registers 1309, the register T 1310, the state register 1311 and the instruction counter 1312 must receive the process command block command information of the new process.

Consequently the firmware sub-program first of all extracts the word PMW3 from the block PCB (FIG. 4) and loads it into the working memory or scratchpad memory 1315 (stage 1432), then it extracts the word PMWO (stage 1431). The field MBZ of the word PMWO is checked at the stage 1433 and if it is not equal to 0, a block-PCB-incorrect exception is produced. However, if the field MBZ of the word PMWO is 0, the word PMW1 is extracted at the stage 1434. The field MBZ of the word PMW1 is likewise checked in order to determine whether it has the binary value 0 or not. If this field is not a binary 0, there is produced a block-PCB-incorrect exception, while if it is equal to 0, the distributor passes on to the stage C.

Consequently the address space word ASWO is extracted from the appropriate location of the block PCB (stage 1436) and the size field of the table word of the segments STWSZ is checked at the stage 1437 in order to determine whether it is greater or less than 7. If it is greater than 7 the result is a block-PCB-incorrect exception; if it is less than or equal to 7 the word ASW1 is extracted at the stage 1438 and its field STWSZ is checked at the stage 1439 in order to determine whether it is less than or equal to 8 or not. If the field is greater than 8, a block-PCB-incorrect exception is produced. However, if the field STWSZ is equal to or less than 8, the exception word EXW is extracted at the stage 1440, and its field MBZ is tested at the stage 1441 in order to determine whether it is or is not equal to zero; if its field MBZ is not equal to zero, a block-PCB-incorrect exception is produced, while if it is equal to zero, the stack word SKW is extracted at the stage 1442 and its field MBZ is tested at the stage 1443 in order to determine whether it is equal to zero or not. If the field MBZ is not equal to 0, a block-PCB-incorrect exception is produced, while if it is equal to 0, the instruction counter word ICW is extracted from the block PCB and placed in the instruction counter IC (at the stage 1444) and its field TAG is tested in order to determine whether it is equal to 0 or not at the stage 1445. If the field TAG of the word ICW is not equal to 0, a block-PCB-incorrect exception is produced. However, if the field TAG is equal to 0, the word MBZ is extracted at the stage 1446 and its field MBZ (bits 0–31) is tested in order to determine whether it is or is not equal to 0, at the stage 1447. If it is not equal to 0 there results a block-PCB-incorrect exception, while if it is equal to 0, the stack 0, 1 and 2 base words SMWO, 1, 2 are extracted at the stage 1448. The contents of the 8 base registers contained in the memorization zone of the base registers of the block PCB are then extracted at the stage 1449 and put into store in the base registers 1308 of the machine. Next, the contents of the 16 general registers of the memorization zone of the general registers of the block PCB are extracted at the stage 1450 and stored in the general registers 1307 of the machine. Before extracting the contents of the scientific registers, however, a check of the function octet of the process main word PMWO is carried out in order to determine whether the scientific mode is or is not being employed at the stage 1451. If the scientific mode is being employed, the contents of the scientific registers of the memorization zone of the scientific registers of the block PCB are extracted and stored at the stage 1452. The firmware then undertakes the execution of an analysis of the function octet of the word PMWO in order to determine whether the counting mode is being employed (stage 1453). If the counting mode is being employed (that is to say, if the function octet counting bit is set to the binary value 1) the counting words are in the block PCB and the ready time counting word RTA is brought to light. Next, the firmware undertakes to determine whether the number DEXT is set to 0 or not (stage 1454). If it is not at 0 it indicates that the machine may be in the emulated mode (that is to say, the decor extension capacity is being employed) and consequently the number DEXT of the word PMWO is checked at the stage 1445 in order to determine whether it is greater or less than the field DETSZ of the word PMW3, and, if it is greater, a block-PCB-incorrect exception is produced; if the number DEXT is less than the field DETSZ but is not equal to 0, the machine operates in an authorized emulated mode, and one passes on to the stage F. Returning to the decision stage 1454, if the field DEXT has the binary value 0, the natural mode is being executed by the machine, and the machine extracts the stack words STW at the stage 1457. The partial execution time word RTO of the block PCB is extracted at the stage 1458 and the process time counter is loaded with the time limit that the process CJP can pass in the under-way state.

At this point either (a) another process NJP has been called upon to take command of the central unit whereas there was a former process CJP in the machine and the new process had a higher priority than that of the old process or (b) there was no process CJP which had command of the central unit and the head of the ready process queue was called. Summarizing, under the condition (a), the process CJP was withdrawn from the process-under-way word PRW and placed in a process connection PL in the queue Q/PR/RDY and the new process NJP which was lying in a procession connection PL in the queue Q/PR/RDY has been placed in the word RPW, thus inverting the positions of the two processes, giving the command to the new process NJP which then becomes the process CJP, and withdrawing the command from the old process. Next, access has been gained to the block PCB of the process NJP and the information required for passing the process NJP, now the process CJP, into the machine has been in the scratchpad memory or in the table of registers of the central unit CPU.

If there were no process CJP which had command of the central unit (condition b) the head of the ready processes queue was called, the process NJP has become the process CJP because the distributor has taken the process NJP from the process connection PL at the head of the ready processes queue and placed it in the word RPW; because of the execution of this operation a process connection PL has been left empty in the queue Q/PR/RDY and it is necessary to withdraw it from the queue.

Consequently, and commencing now at the decision stage 1461b, the firmware determines whether there was or was not a process CJP which had command of the central unit and in the affirmative case access has been gained to a free process connection FPLS and it has been put into the queue and the process CJP has been described. However, if there were no process CJP which had command of the central unit, the state octet of the word PMWO of the new process is brought to light at the stage 1460, and a check is carried out afresh at the stage 1463 in order to determine whether there was or was not a process CJP in the machine.

If there were no process CJP which had command of the process, the process connection NJP (which was in the queue Q/PR/RDY and which now has command of the machine) is withdrawn from the queue Q/PR/RDY at the stage 1466 and becomes a free connection semaphore FLSP and is then in the queue of free process connections (805 in FIG. 9) and then forms part of the queue of free process connections at the stage 1466a, the contents of the boundary address register BAR is then extracted at the stage 1464 and the process-under-way word RPW of the process NJP (now the process CJP) located at the address BAR+56 of the base of the system is brought to light by placing the identification of the process NJP in the word RPW at the stage 1465. The free indicator is set to zero in the event that there was no process CJP at the stage 1468. Next, the conflict indicator (that is to say, a flipflop of the auxiliary memory 1317a employed for indicating a possible conflict of priority between the process under way CJP and a process placed in the ready processes queue) is set to 0 at the stage 1467 and the segments associator (associative memory AS 132 in FIG. 1) which is an addressable memory is emptied at the stage 1471, then the process mode is entered at the stage 1470. (A process mode indicates that the exceptions are processed by the process which is in execution in the processor and not by the exploitation system). The firmware then carries on to the stage CAB 1480 (check of the alarm bit) and the asynchronous trap bit AB is checked at the stage 1481 in order to determine whether it is set to the value 1 or not. If the bit AB is set to the binary value 1 a check is carried out at the stage 1482 in order to determine whether the process ring number PRN is higher than or equal to the asynchronous ring number ARN. The fields AB and ARN are located in the priority octet of the block PCB of each process and are significant when the process is in the under-way state. The fields AB and ARN are obtained by the word RPW which lies at the address BAR+56 of the base of the system. The fields AB and ARN at the address BAR+56 of the word RPW are reset to zero at the stage 1483 inasmuch as the next stage 1484 consists in the execution of an asynchronous trap routine which must clear up the conditions which have caused the putting into the alarm octet of the asynchronous trap bit or of the asynchronous ring number. If these bits were not reset to zero they would give the next passage of the firmware a disturbance indication whereas there would be nothing abnormal and consequently they would still cause the asynchronous trap routine and would prevent passing on to normal execution. Returning now to the decision stages 1481 and 1482, if the bit AB is not set to 1 or if the bit AB is brought to logical "1" and the number PRN is not greater than the number ARN, the firmware then undertakes to determine in which mode the processor is operating, the normal mode or the emulated mode. Consequently the number DEXT is checked in order to determine whether it is set to zero or not and if it is set to zero the normal mode of the machine is being used at the stage 1487; however, if the number DEXT is not set to 0 the emulated mode is being used at the stage 1486. The continuous firmware in CAB 1480 (check of the alarm bit) and the alarm bit AB are tested in stage 1481 to determine whether the bit is set to binary 1 or not. Information concerning asynchronous events can be communicated from one program to another, consignee program in one of the 3 following ways: (1) create different processes which will accomplish identical tasks on behalf of the consignee program, that is, in practice the processes wait for a sempahore until the asynchronous events are produced and are next referred to the consignee program (instruction P); (2) create a single process which will scan, without stopping, the various semaphores to collect the information relative to the events which lie on thse semaphores; and (3) one process compels the consignee process to carry out an asynchronous trap at a certain moment.

The advantage of (1) is that the program will receive by way of one of the created processes the information relative to the events immediately as they are produced. On the other hand, this advantage is offset by the necessity of employing an extended memory zone for the control blocks of the processes created and for the corresponding software.

Although (2) requires only a limited memory zone (one single PCB) the process for collection of the events must remain in course of execution until the last event is produced. In a monoprocessor in which a single process is under way, there is a large consumption of machine time. The third way has the same advantages as the (2), but it is the process in course of execution which warns one or a number of other processes that an item of information is to be taken into consideration. The problem which is solved by the invention is the following: the process which is in course of execution (CJP) must warn processes Ji, Pi.....Jn, Pn that something has been produced. Now, CJP does not absolutely know where the other processes are, in which state they are ("suspended", "ready", or "waiting"), in which queue they are located and when they will be capable of again taking command of the processor. On the other hand it knows the names of the processes which it must warn of this event.

By analogy, the situation is the same as that of a researcher in a laboratory who discovers an event liable to interest other researchers who are at the time out of the laboratory. The first researcher knows the names of the interested persons and knows that they will come into the laboratory only when he has left it but at any moment (asynchronism) after this departure. A solution consists in placing at the entrance to the laboratory a notice saying: "Mr. P., please go to the caretaker where a message is waiting for you"; when the researcher J. P passes by the caretaker's shack he will be informed that a message is waiting for him and will be able to examine this message.

The mechanism of the alarm bit is identical in that every time a new process J.P takes command of the processor the alarm bit or asynchronous trap bit is tested. If the alarm bit or asynchronous trap bit is at 1, the ring number is likewise tested. If the ring number is greater than or equal to an alarm ring number (that is to say, if the privilege level of the process is lower than that of the alarm ring an asynchronous trap is carried out). This latter test corresponds with the desire not to trap a process which is being called to process system functions (privilege 0). In fact, it is not very probable that an event signalled by a process can concern the operation of the system itself, and the precaution which is thus taken is in general superfluous.

The asynchronous trap finds expression in an interruption or a suspension of the process and in an entry into the exceptions manipulator and has access to the exceptions table.

The microsoftware writes the message to be communicated to the process either in memory or in the general registers of the system. Access of the process to the message is effected in accordance with the exceptions processing procedure which has been described in the U.S. Application, Ser. No. 528,955 filed Dec. 2, 1974, entitled "Device and Method Ensuring the Processing of Exceptions in a Data Processing Machine", that is to say, the asynchronous trap exception executes by means of a simulated instruction V a stack and entry preparation or an interruption mechanism which proceeds to an exchange of process.

The alarm bit is tested every time a new process takes command of the processor. It must also be tested during the course of the output instructions EXIT when the privilege level has been modified during the execution of the process. The privilege level of the process may have become greater than the level of the alarm and the message then interests the process.

It is of course possible to apply this method to the management of events and to make a generalized use of it in a system having multiple processors without thereby departing from the scope of the invention.

What is claimed is:

1. In a computing system capable of processing a plurality of processes including central memory means for storing a process control block for each of the processes, means for operating the processes in queues, central processor means for executing one of the processes during a predetermined time and for maintaining the unexecuted processes in queues located in the central memory means, said unexecuted queues being organized by priority into various states of readiness for execution, distributor means for giving command of the central processor means to the one of the processes having the highest priority, and means for assigning to each of the processes a process ring number symbolizing a priority level, improved apparatus for communicating instructions between at least some of the processes comprising:
   memory element means located in each process control block for storing information;
   means responsive to the process being executed for modifying the information stored in the memory element means associated with processes to which instructions are to be communicated;
   interrupt means responsive to the information stored in the memory element means for causing an interrupt; and
   exceptions means responsive to the interrupt for enabling the instruction to be communicated to each process corresponding to a memory element means in which the modified information was stored.

2. Apparatus, as in claim 1, wherein the interrupt means is responsive to the modified information every time the distributor means assigns control of the central processor means to another process.

3. Apparatus, as in claim 1, wherein the processes have priority levels determined by the nature of operations being carried out, the priority levels being defined by ring numbers associated with respective processes;
   means for testing the memory element means and for thereafter testing the number of the ring in which the process is being executed, the interrupt means responsive to said testing means to cause an interrupt only in response to the tested process ring number being greater than or equal to a predetermined alarm ring number.

4. Apparatus, as in claim 3, wherein the means for testing the memory element means is activated during execution of an output instruction by the central processor means in response to a process being changed while being executed.

5. In a computing system capable of processing a plurality of processes including central memory means for storing a process control block for each of the processes, means for operating the processes in central queues, processor means for executing one of the processes during a predetermined time and for maintaining the unexecuted processes in queues located in the central memory means, said queues being organized by priority into various states of readiness for execution, distributor means for giving command of the central processor means to the one of the processes having the highest priority, and means for assigning to each of the processes a process ring number symbolizing a priority level, a method of communicating instructions between at least some of the processes comprising the steps of:
   storing information in a memory element means located in each process control block;
   executing the process being executed to modify the information stored in the memory element means associated with the process to which instructions are to be communicated;
   causing an interrupt in response to the information stored in the memory element means; and
   in response to the interrupt, communicating the instruction to each process corresponding to a memory element means in which the modified information was stored.

6. The method of claim 5, wherein the interrupt means is responsive to the modified information every time the distributor means assigns control of the central processor means to another process.

7. The method of claim 5, including the additional steps of:
   generating a priority level defined by the ring number in response to a function of the nature of the operations being carried out; and
   testing the memory element means and thereafter testing the number of the ring in which the process is being executed, the interrupt ring caused only in response to the process ring number being greater than or equal to a predetermined alarm ring number.

8. The method of claim 7, wherein the testing step is carried out during execution of an output instruction by the central processing means in response to a process ring changed while being executed.

* * * * *